(12) United States Patent
Marti et al.

(10) Patent No.: US 7,879,748 B2
(45) Date of Patent: Feb. 1, 2011

(54) METHOD FOR PRODUCING A CATALYST AND THE CATALYST MADE THEREFROM

(75) Inventors: Michael A. Marti, Owasso, OK (US);
John G. Nunan, Tulsa, OK (US);
Stephen B. Halliday, Oakville (CA);
Mikhail A. Rodkin, Princeton, NJ (US)

(73) Assignee: Umicore AG & Co. KG, Hanau (DE)

( * ) Notice: Subject to any disclaimer, the term of this patent is extended or adjusted under 35 U.S.C. 154(b) by 1211 days.

(21) Appl. No.: 11/463,352

(22) Filed: Aug. 9, 2006
(Under 37 CFR 1.47)

(65) Prior Publication Data
US 2008/0038161 A1    Feb. 14, 2008

(51) Int. Cl.
*C07C 1/00*      (2006.01)
*C07C 2/00*      (2006.01)
*C07C 4/00*      (2006.01)
*C07C 5/00*      (2006.01)
*C07C 6/00*      (2006.01)
*B01J 19/12*     (2006.01)
*B01J 37/34*     (2006.01)
*A62D 3/00*      (2007.01)
*C01D 1/00*      (2006.01)

(52) U.S. Cl. .................. 502/5; 502/522; 204/157.15; 204/157.4; 204/157.43; 204/157.51

(58) Field of Classification Search ............ 502/5, 502/522; 204/157.15, 157.4, 157.43, 157.51
See application file for complete search history.

(56) References Cited

U.S. PATENT DOCUMENTS 4,745,094 A * 5/1988 Belloni Cofler et al. ........ 502/5

5,691,263 A * 11/1997 Park et al. ............... 502/66

(Continued)

FOREIGN PATENT DOCUMENTS

EP        0507122 A2    10/1992

(Continued)

OTHER PUBLICATIONS

The Impact of Gasoline Fuel Sulfur on Catalytic Emission Control Systems; Sep. 1998; Manufacturers of Emission Controls Association, 1660 L Street NW, Suite 1100, Washington, DC 20036; 21 pages.

(Continued)

*Primary Examiner*—Patricia L Hailey
(74) *Attorney, Agent, or Firm*—Smith, Gambrell & Russell, LLP

(57) ABSTRACT

Disclosed herein are methods for manufacturing a catalyst composition. In one embodiment, a method for manufacturing a catalyst can comprise: forming a catalyst composition from a catalyst precursor and a volatile compound, disposing the catalyst composition on a substrate to form a supported composition, treating the supported composition with electromagnetic radiation, and removing at least a portion of the volatile compound to form the catalyst. In another embodiment, the method for manufacturing a catalyst can comprise: forming a catalyst composition comprising a volatile compound and a catalyst precursor, disposing the catalyst composition onto a substrate, and drying the catalyst composition at a temperature greater than or equal to a dew point of the volatile compound and less than or equal to a decomposition temperature of the catalyst precursor.

24 Claims, 24 Drawing Sheets

U.S. PATENT DOCUMENTS

| | | | |
|---|---|---|---|
| 5,719,095 A * | 2/1998 | Brekner et al. | 502/104 |
| 6,124,584 A | 9/2000 | Blaker et al. | |
| 6,200,927 B1 | 3/2001 | Shukis et al. | |
| 6,202,320 B1 | 3/2001 | Chow | |
| 6,239,054 B1 | 5/2001 | Shukis et al. | |
| 6,239,066 B1 | 5/2001 | Shukis et al. | |
| 6,291,394 B1 | 9/2001 | Shukis et al. | |
| 6,562,749 B1 * | 5/2003 | Lednor et al. | 502/66 |
| 2006/0183626 A1 * | 8/2006 | Cavalcanti et al. | 502/5 |
| 2006/0183942 A1 * | 8/2006 | Gaffney et al. | 562/547 |
| 2008/0223712 A1 * | 9/2008 | Min et al. | 204/157.4 |

FOREIGN PATENT DOCUMENTS

| | | | |
|---|---|---|---|
| JP | 2007-307436 | * | 11/2007 |
| WO | 0232572 A2 | | 4/2002 |

OTHER PUBLICATIONS

Gomez, Adrian, et al.; LEVs and ULEVs: Clean Air Ahead?; Physics 301—Energy and the Environment; Summer 1998; LEV and ULEV Internal Combustion Technology—AmeriSurfers Case 3; http//energy.fullerton.edu/amerisurfers-case3.html; 6 pages.

National Low Emission Vehicle (NLEV); IDEM Office of Air Management; Fact Sheet; Sep. 1998; (FCTM01); (800) 451-6027 extension 3-5677 or (317) 233-5677.

Clark, Timothy D.; The Current Status of Radio Frequency Post-Baking Drying Technology; presented at the 72nd Annual Technical Conference of the Biscuit and Cracker Manufacturers' Association at the Worthington Hotel, Forth Worth, Texas; Oct. 21, 1997; http://www.macrowave.com/products/current.html; 11 pages.

Shamim, Tarig, et al; Report Brief—Performance Analysis of Catalytic Converters, Apr. 1999; Center for Engineering Education and Practice; College of Engineering and Computer Sciene; University of Michigan-Dearborn; http://www.engin.umd.umich.edu/ceep/reports/97-98/shamim.html; 4 pages.

Martinez-Arias, A., et al; Effect of Thermal Sintering on Light-Off Performance of PD/(Ce,Zr)Ox/Al2O3 Three-Way Catalysts: Model Gas and Engine Tests; Journal of Catalysis; 204; 238-248; (2001).

Williamson, W.B., et al; Palladium and Platinum/Rhodium Dual-Catalyst NLEV and Tier LLA Close-Coupled Eission Solutions; SAE Technical Paper Series; 2001-01-0923; SAE International; SAE 2001 World Congress, Detroit, Michigan, Mar. 5-8, 2001; 400 Commonwealth Drive, Warrendale, PA 15096-0001; 12 pages.

* cited by examiner

US 7,879,748 B2

METHOD FOR PRODUCING A CATALYST AND THE CATALYST MADE THEREFROM

BACKGROUND

The present disclosure is related to methods for producing catalyst compositions from precursors containing both volatile and non-volatile components, and the compositions obtained therefrom.

Exhaust emission control devices (e.g., catalytic converters, NOx catalysts, selective catalytic reduction catalysts (SCR), and so forth) utilized in exhaust systems of vehicles generally comprise a housing around a ceramic, metallic-honeycomb or corrugated substrate coated with a catalytically active layer. The catalytically active layer, which generally comprises high surface area porous particles, promotors, stabilizers, binders, and catalytically active precious metals, is preferably applied to the substrate in the form of a wet slurry (e.g., a washcoat) so as to uniformly coat the interior walls of the substrate. The coated substrate is then calcined in a gas fired or electric oven/furnace in order to remove water and other volatile compounds such as, for example, alcohols (e.g., methanol, ethanol, and the like,) acetone, toluene, and the like, nitric oxides, sulfurous oxides, and the like, from the coating.

The calcining of catalyst compositions solely via convection or conduction equipment, such as, for example, gas fired or electric ovens, is time-consuming and expensive, with calcining temperatures generally being around 500° C., and calcining times generally being about 3 to about 7 hours or so. In addition, these methods of calcining embody poor energy transfer to the catalyst, which leads to: non-uniform heating of the catalyst, uneven water evaporation from the washcoat, formation of chemical concentration gradients within the washcoat, and severe thermal shock for certain types of substrates that can result in the fracture of the substrate.

As a result of these drawbacks, there remains a need for methods of producing catalyzed substrates with more even heating across the bulk of the catalyst and/or with reduced production cycle times and hence reduced production costs.

BRIEF SUMMARY

Disclosed herein are methods for manufacturing catalysts, catalysts made therefrom, and exhaust emission control devices comprising such catalysts. In one embodiment, a method for manufacturing a catalyst can comprise: forming a catalyst composition from a catalyst precursor and a volatile compound, disposing the catalyst composition on a substrate to form a supported composition, treating the supported composition with electromagnetic radiation, and removing at least a portion of the volatile compound to form the catalyst.

In another embodiment, the method for manufacturing a catalyst can comprise: forming a catalyst composition comprising a volatile compound and a catalyst precursor, disposing the catalyst composition onto a substrate, and drying the catalyst composition at a temperature greater than or equal to a dew point of the volatile compound and less than or equal to a decomposition temperature of the catalyst precursor.

The above described and other features are exemplified by the following figures and the detailed description.

BRIEF DESCRIPTION OF THE DRAWINGS

Refer now to the figures, which are exemplary embodiments, and wherein the like elements are numbered alike.

DETAILED DESCRIPTION OF PREFERRED EMBODIMENTS

Figure 1:
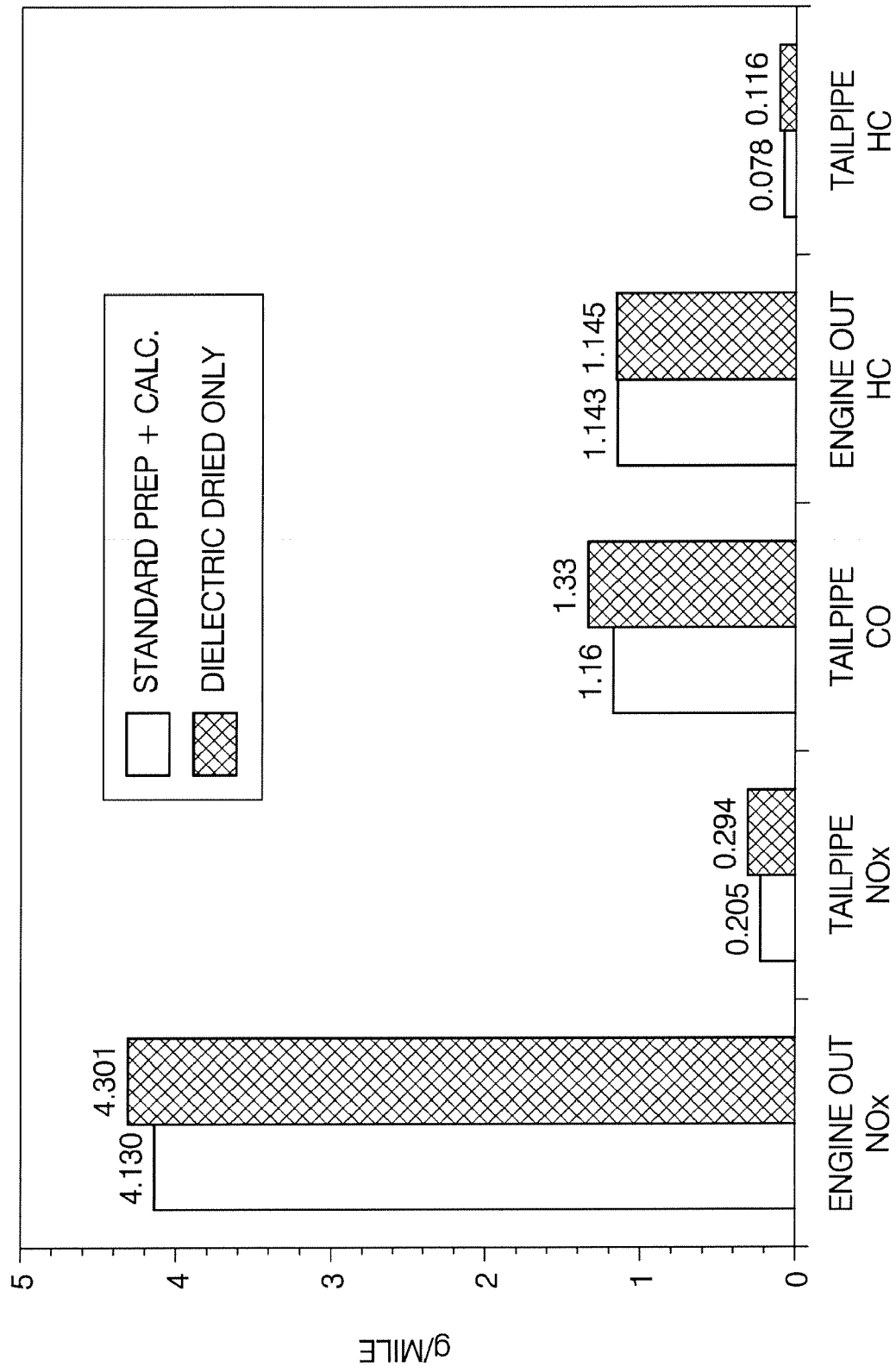
FIG. 1 is a bar graph comparing nitrogen oxides (NOx), carbon monoxide (CO), and hydrocarbon (HC) emissions in grams per mile (g/mile) for calcined (calc.) catalyst compositions using convectional heating versus those dried using electromagnetic heating for a first Federal Test Procedure (FTP) when the catalytically active metal precursors are rhodium nitrate and platinum nitrate.

It is noted that the terms "first," "second," and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt %, with 5 wt % to 20 wt % desired," are inclusive of the endpoints and all intermediate values of the ranges of "5 wt % to 25 wt %," etc.). The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

This disclosure relates to methods of forming articles (such as exhaust emission control devices) and the articles formed therefrom, wherein a catalyst composition in the article has been dried (optionally without calcination), such process producing articles with good adhesion between the active catalyst component and the support and reducing the harmful NOx emitted during the manufacturing process. Such drying can be accomplished either by using various means such as convective or radiant heating or evacuation, or by the application of electromagnetic radiation. Sufficient electromagnetic radiation can be applied to the catalyst composition to dry the catalyst composition (i.e., remove physically bound volatile compound(s) (e.g., water, solvents, volatiles, and the like) that are not chemically bound in the catalyst composition). It is understood that, in some embodiments, sufficient electromagnetic radiation can be applied to the catalyst composition (or a portion of the catalyst composition) to calcine the catalyst composition (e.g., to remove chemically bound water, to remove fugitive materials, volatilize any volatile organic compounds, and convert catalyst precursor(s) (e.g., catalytically active metal precursor(s)) to catalytically active forms of the catalyst)). Optionally, subsequent to the application of electromagnetic radiation, the catalyst composition can be calcined via non-electromagnetic radiation heating (e.g., by conduction, convection, or a combination comprising at least one of conduction and convection) or can subsequently be calcined in the stream to be treated (e.g., the exhaust stream) or in a flue.

The calcination step decomposes the metal precursors such as metal nitrates, metal chlorides, and the like, as well as evaporates volatiles. The calcination step, in addition to facilitating the removal of decomposition byproducts such as nitrogen oxides (NOx), sulphurous oxides (SOx), water ($H_2O$), carbon monoxide (CO), and carbon dioxide ($CO_2$), and the like, results in the retention of catalytically active metals in the catalyst composition. Calcination also improves adhesion between the washcoat and the substrate. It has now been discovered that electromagnetic radiation can be advantageously used to heat a catalyst composition in a shorter time period and at a reduced cost when compared with heating methods involving the use of equipment such as gas fired and/or electric ovens, furnaces, and the like. In addition, catalyst compositions that are electromagnetically heated appear to display no measurable loss in the mechanical integrity of the substrate, and no compositional or physical gradients across the bulk of the heated catalyst composition. Thus, the electromagnetically heated catalyst compositions display greater uniformity when compared with catalyst compositions heated in gas fired/electrically heated ovens, furnaces, and the like.

As defined herein, the terms electromagnetic heating, electromagnetic drying, dielectric heating, and dielectric drying may be used interchangeably and refer to the process of heating the catalyst composition by utilizing electromagnetic radiation. Electromagnetic radiation includes, for example, radio frequency (RF), microwave, infrared (IR), and electron-beam. While several different frequencies within the electromagnetic spectrum may be utilized for heating the catalyst compositions, radio frequencies and microwave frequencies have proven particularly useful. The radio frequencies employed can be about 10 kilohertz (KHz) to about 100 megahertz (MHz), or, more specifically, about 1 MHz to about 50 MHz, or, even more specifically, about 5 MHz to about 42 MHz. For example, a radio frequency(ies) of about 10 kilohertz to about 100 megahertz, a microwave frequency (ies) of about 0.5 gigahertz to about 1 terahertz, or a combination comprising at least one of the foregoing frequencies can be employed for drying.

In general, the electromagnetic energy (input) delivered to the catalyst composition can be sufficient to dry the catalyst without calcination. For example, this energy may be about 0.001 watt/gram to about 1,000 watts/gram, or, more specifically, about 0.1 watt/gram to about 500 watts/gram (essentially 1 watt removes one gram of water from the composition per hour without calcination). Based upon the total weight of the substrate with the catalyst composition, the energy may be about 0.01 watts/gram to about 20 watts/gram to dry the substrate in about 15 minutes, with about 0.1 to about 10 watts/gram preferred.

In one embodiment of radio frequency heating, a substrate comprising a catalyst composition precursor is placed between two parallel plates or electrodes where the substrate becomes the dielectric of a capacitor. Not to be bound by theory, it is believed that, when a material is introduced between the parallel plates (or electrodes) and an alternating radio frequency is applied to generate an electrical field, energy is absorbed due to the presence of ions in the water which give a significant electrical conductivity, σ. Heat is generated due to the passage of electrical current through the water. Therefore, ionically conducting materials, such as water, can be heated rapidly in a radio frequency field. The heat generated through radio frequency heating is shown in Equation I below:

$$P = \omega \epsilon_o \epsilon''_r E^2 \quad (I)$$

where: P is the power dissipation per unit volume,
ω is $2\pi f$,
f is the applied frequency,
$\epsilon_o$ is the permittivity of free space,
$\epsilon''_r$ is the dielectric loss factor of the material, and
E is the local applied electric field.

Figure 24:
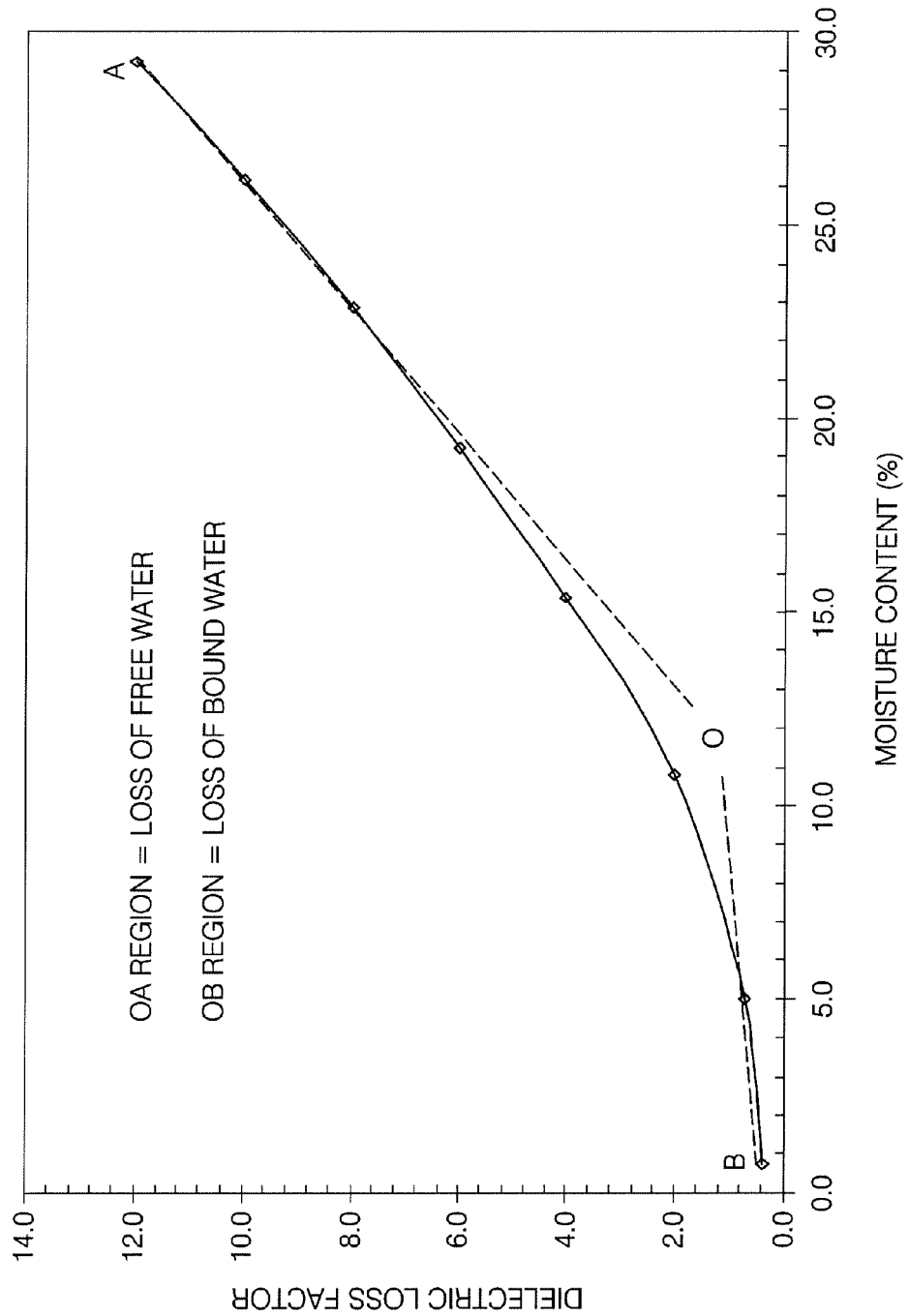
FIG. 24 is a plot of the dielectric loss factor as a function of moisture content showing that at low moisture contents the dielectric loss factor is low and changes very little as the moisture content further decreases.

Since heat is developed directly in the materials (e.g., in the catalyst composition), uniform and rapid heating are possible. An advantage of dielectric drying is the automatic moisture leveling throughout the volume of the part that occurs during the drying process. It is believed that if the effective electric field strength is constant then the dielectric loss factor (and thus the power dissipation per unit volume) is directly proportional to the moisture content as shown in FIG. 24. As the moisture content decreases, the rate of energy adsorption also decreases and thus the moisture level within the part evens out. At low moisture content the rate of energy absorption is greatly reduced due to the presence of chemically bound water and absence of free water. At the low moisture content ranges, the dielectric loss factor is substantially constant. Hence, the rate of drying is low and the weight of the part tends towards a constant value at low moisture content; e.g., a moisture content of less than or equal to about 10 wt %, or, more particularly, less than or equal to about 5 wt %.

This feature of electromagnetic drying has great value in doing mass balance platinum group metal (PGM) accounting after coating and drying as the dried part will attain a substantially constant weight; e.g., the weight does not change with time. Not to be bound by theory, it is believed that standard high temperature convection/conduction calcination processes (e.g., temperatures of 350° C. to 600° C.) are believed to remove chemically bound water. The resulting catalysts are highly hydroscopic with a high tendency to re-adsorb water over time, giving varying weights, and making PGM accounting using weight measurements difficult. However, for electromagnetic dried parts, physi-sorbed water (free water) is removed during the drying process to produce a dried part that has a stable weight; that is, the weight does not change with time. This feature, coupled with the rapid rate of electromagnetic drying, allows for a very accurate and rapid measurement of the washcoat loading on a part after suitable calibrations.

Energy generators for emitting electromagnetic radiation in the radio frequency range can be continuous wave or pulsed wave generators and either or both of these types of generators can be utilized in the heating process. Continuous wave generators are those which continuously emit electromagnetic radiation/waves of a particular frequency, while pulsed wave generators are those, wherein radiation of a particular given frequency or radiation of variable frequencies are intermittently generated (pulsed) in order to heat and dry the catalyst composition. Pulsed wave generators may generally provide better control of the heating characteristics of the catalyst composition.

In the electromagnetic heating of the catalyst composition, it is envisioned that combinations of different frequencies within the electromagnetic spectrum may be effectively utilized. For example, electromagnetic radiation from the visible range and/or the infrared range of the electromagnetic spectrum can be combined with radio frequency (RF) and/or microwave radiation to effect heating. Such combinations of different frequencies of electromagnetic radiation can be sequentially or simultaneously utilized in the heating process. For example, the wet catalyst composition may first be heated using infrared (IR) radiation, followed by RF heating, followed by microwave heating, and the like, if desirable. Alternatively, the catalyst composition may be simultaneously heated by several different frequencies within the electromagnetic spectrum. In one embodiment, lasers may be used in conjunction with RF heating or microwave heating to heat the wet catalyst compositions.

Heating of the catalyst composition can also be accomplished by subjecting the catalyst composition to a combination of electromagnetic heating and thermal heating (e.g., via convection and/or conduction). The electromagnetic heating and the thermal heating may be carried out simultaneously or sequentially. It may also be desirable to dry (and optionally to calcine) the wet catalyst composition by utilizing a combination of thermal heating with electromagnetic heating derived from a single frequency or the simultaneous use of multiple frequencies within the electromagnetic spectrum. This combination of heating is generally advantageous when the samples to be heated are large in size, such as, for example, over 15 cubic centimeters ($cm^3$), and when the heating is to be conducted in the microwave frequency region. In one embodiment, such large sized substrates may be jointly heated in an oven where convection heating is employed in conjunction with heating derived from radio frequency and/or microwave radiation. In such instances, the heating by convection and/or conduction can be used to heat the catalyst to any preset desired temperature, while additional increases in temperature can be obtained via the electromagnetic heating.

Not to be bound by theory, when solely heating by convection, a temperature gradient usually exists in the heated material, wherein the outer surface or skin temperature is greater than the internal or core temperature. This effect is commonly termed a 'skin-core' effect and gives rise to chemical or physical gradients within the catalyst composition. Microwave and radio frequency heating, on the other hand, generally heats more uniformly across the cross-section of the coated substrate. However, because of the ability of the heat at the surface or skin to more easily dissipate to the surrounding media than the internal heat, there could occur a reverse 'skin-core effect' wherein the core temperature is generally greater than the skin temperature. Thus, for sample sizes larger than about 15 cm$^3$, a combination of heating by convection and/or conduction as well as microwave and/or radio frequency heating can be advantageously used to further enhance temperature uniformity, thereby further reducing chemical concentration gradients or physical property gradients within the catalyst composition.

For example, a coated substrate (comprising the catalyst composition) is subjected to electromagnetic radiation in a device commonly termed an applicator or waveguide. If desired, other heat generating sources may be added to the waveguide. A waveguide or applicator is a device or cavity that enables propagation of the radiation (e.g., microwave and/or radio frequency radiation) through the heating zone, in which the coated substrate is located, and thereby heated.

Formation of an article with an electromagnetically heated catalyst composition can comprise forming a catalyst composition, disposing the composition onto a substrate and electromagnetically heating the catalyst composition. Depending upon whether the catalyst composition has or has not been calcined, the catalyst composition may be subsequently calcined in a reducing environment, e.g., an organic reducing environment. Optionally, the catalyst can be calcined in the exhaust stream on the vehicle.

Forming the catalyst composition can comprise combining various catalyst precursor(s) (e.g., catalyst metal(s), oxide(s), and the like), with optional solvent(s), reducing agent(s), fugitive material(s), stabilizing agent(s), binder(s), and so forth. Possible catalyst precursor materials include platinum, palladium, rhodium, iridium, osmium, ruthenium, tantalum, zirconium, yttrium, cerium, nickel, manganese, copper, and so forth, oxides comprising at least one of the foregoing, alloys comprising at least one of the foregoing, as well as combinations comprising at least one of the foregoing catalyst materials. Trapping material(s) can include zirconia and/or ceria, and so forth. Possible stabilizing agent(s) include Group II metals, rare earth metals, Group VIII metals, and the like, as well as oxides comprising at least one of the foregoing, alloys comprising at least one of the foregoing, as well as combinations comprising at least one of the foregoing, with barium, lanthanum, and combinations comprising barium and/or lanthanum preferred. Possible reducing agent(s) include sugar, hydrogen, hydrazine, hydrocarbons, carbon monoxide, and the like, as well as combinations comprising at least one of the foregoing.

Fugitive material(s) include various non-soluble organics and/or inorganics that vaporize or otherwise decompose upon heating and/or calcination, such as carbons, non-soluble organics, and/or latex, and the like. As with the fugitive material, the solvent(s) comprise materials that vaporize or are otherwise removed during heating and/or calcination. Suitable, but non-limiting examples of solvents include water, alcohol(s), acetone, terpinol, xylene(s), toluene, methyl ethyl ketone, methyl butyl ester, and so forth, as well as combinations comprising at least one of the foregoing.

The catalyst composition can be disposed onto the substrate via various techniques such as washcoated, imbibed, impregnated, sprayed, physisorbed, chemisorbed, precipitated, or otherwise applied to the substrate. The substrate can comprise any material compatible with the environment in which the article will be employed, and which has a sufficient surface area. For use in an emission treatment device, possible materials include cordierite, silicon carbide, metal, metal oxides, (e.g., alumina, silica, and the like), glasses, hexaaluminates, and the like, and mixtures comprising at least one of the foregoing materials. These materials can be in the form of foils, preforms, mats, fibrous materials, monoliths (e.g., honeycomb structure, and the like), other porous structures (e.g., porous glasses, sponges) foams, pellets, particles, molecular sieves, and the like (depending upon a particular device), and combinations comprising at least one of the foregoing materials and forms, e.g., metallic foils, open pore alumina sponges, and porous ultra-low expansion glasses.

Once the catalyst composition has been disposed on/in the substrate, the coated substrate can be passively and/or actively dried to remove free water and other similar solvents (e.g., water and solvents that are not chemically bound in the catalyst composition), with removal of a majority of the water and solvent preferred. Active removal can comprise electromagnetic heating the catalyst composition and, optionally employing conduction and/or convection. Preferably, electromagnetic heating is employed where the free solvents (e.g., physically bound water and/or other solvents) are heated to above their dew point and optionally below the calcination temperature, e.g., are heated to a temperature greater than or equal to about the dew point and less than or equal to about the nitrate decomposition temperature.

For example, in one embodiment, the electromagnetic heating can be performed at a temperature of about the dew point to about 150° C., or, more specifically, a temperature of about the dew point to about 100° C., or, even more specifically, about the dew point to about 80° C.

Adhesion can be enhanced and chemical gradients can be reduced or eliminated during calcination by removal of the water. With the electromagnetic drying, greater than or equal to about 80 wt % of the free solvents can be removed, or, more particularly, greater than or equal to about 90 wt %, or, even more particularly, greater than or equal to 98 wt % of the free solvents can be removed prior to calcination, based upon the total weight of the free solvents.

The time period for electromagnetic heating may be a period of time sufficient to remove the free solvents at that temperature. Due to the efficiency of this process, typical time periods for drying are less than or equal to about 100 minutes, with less than or equal to about 60 minutes readily attained, less than or equal to about 40 minutes possible, and less than or equal to about 20 minutes preferred.

A catalyst composition thus electromagnetically dried can be calcined by convection and/or conduction, such as, for example, in a gas fired/electrically heated furnace or oven and/or directly placed in the stream to be treated (e.g., flue stream, exhaust stream, or the like). For example, when placed directly in the exhaust stream of an internal combustion engine, decomposition of the catalytic metal precursor takes place in a reducing environment provided by the spark ignition at start-up. During the engine start-up, the exhaust stream is fuel rich (i.e., it contains excess hydrocarbons). The method of decomposition (e.g., calcining in the stream to be treated) has a number of advantages such as eliminating the time consuming and energy intensive step of calcining the material by other methods (e.g., in a gas fired or electric oven or furnace which can take about 3 to about 7 hours). In addition, this process obviates the need for the scrubbing step at the factory since NOx, and the like, are released in low quantities or can be chemically reduced to a non-noxious chemical state such as NOx reduction to $N_2$ in the reducing atmosphere of the effluent stream (e.g., if a gasoline internal combustion engine is used).

During the process of electromagnetic heating, the atmosphere in the electromagnetic radiation apparatus can optionally be modified to facilitate the reduction and removal of decomposition by-products. The decomposition of the catalytic metal precursors such as platinum and palladium nitrates, platinum chlorides and sulfides, and the like, can give rise to decomposition by-products such as nitrogen oxides (NOx), and carbon dioxide ($CO_2$). The use of a reducing atmosphere comprising hydrogen or hydrazine can help to convert nitrogen oxide to $N_2$ for example.

When a reducing atmosphere, such as hydrogen or hydrazine is used, it is preferable to conduct the electromagnetic drying at temperatures greater than or equal to about the dew point of the solvent and less than or equal to about the decomposition temperature of the catalytic metal precursor. Catalytic metal precursors such as platinum and palladium nitrates generally decompose at temperatures of about 200° C. to about 300° C. It may also be desirable to apply a vacuum to the cavity during the process of drying to facilitate the removal of volatiles (e.g., volatile compound(s)). The vacuum applied can be less than or equal to about 760 mm of mercury (Hg), more specifically, less than or equal to about 500 mm of Hg, and even more specifically, less than or equal to about 300 mm of Hg. During the process of electromagnetic heating, it may also be desirable to agitate (continuously or intermittently) the catalyst composition. The agitation can include spinning, grinding, impacting, tumbling, and/or sparging, and the like. The intermittent agitation, for example, can be used simultaneously or sequentially with the electromagnetic heating.

In the case of monolithic catalyst or support, air flow directed down the monolith channels can be used to remove excess water vapor during the electromagnetic drying process. Mass transfer and effective removal of volatiles during electromagnetic drying can be problematic and can result in blistering and rupture of the product for certain applications where water vapor removal is limited by mass transfer. In this respect electromagnetic drying of monolithic catalysts in the presence of an air flow reduces and often eliminates these problems, contributes significantly to shortening the time for the drying process, and makes monolithic type materials (because of their mass transfer properties) particularly suited for electromagnetic drying applications.

There are a variety of ways in which the catalyst composition may be prepared either before or during the process of being subjected to electromagnetic heating and drying. A few non-limiting examples are briefly described below.

In one method of the formation of the catalyst composition, the support, catalytic metal component, and/or trapping materials may be combined to form a slurry which is then subjected to electromagnetic heating. Alternatively, all of, or only a portion of the catalytic metal component and/or the trapping materials may be deposited on or within the support prior to or after heating by electromagnetic radiation, by techniques such as ion implantation, chemical vapor deposition, and the like. In another example of preparing the catalyst composition, the catalytic metal precursor and trapping materials, individually or together, can be dissolved as soluble precursors in an aqueous or organic solvent, which is then impregnated or coated onto the porous support. The porous support together with the soluble precursor may then be electromagnetically heated. As stated above, the electromagnetically heated catalyst composition may in each case be placed in the exhaust stream of an internal combustion engine, if desired, for calcination.

In one embodiment, the exhaust emission control device comprises a substrate comprising a catalyst, a housing disposed around the substrate, and a retention material disposed between the substrate and the housing. The catalyst can be formed by the method comprising: forming a catalyst composition from a catalyst precursor and a volatile compound, disposing the catalyst composition on a substrate to form a supported composition, treating the catalyst composition with electromagnetic radiation, and removing at least a portion of the volatile compound to form the catalyst. Optionally, the catalyst can be formed by the method comprising: forming a catalyst composition comprising a volatile compound and a catalyst precursor, disposing the catalyst composition onto a substrate, and drying the catalyst composition at a temperature greater than or equal to a dew point of the volatile compound and less than or equal to a decomposition temperature of the catalyst precursor.

The following examples, which are meant to be exemplary, not limiting, illustrate compositions and methods of manufacturing some of the various embodiments of the electromagnetically heated catalyst compositions using various materials and apparatus.

EXAMPLES

For samples 1-4 utilized in Examples 1-5, the washcoat comprised boehmite sol as a binder, in an amount of 3.8 wt % boehmite (hydrous aluminum oxide ($Al_2O_3$)). Barium sulfate was utilized as the overall washcoat stabilizer and comprised 11.4 wt % of the washcoat. Sugar was utilized as a reducing agent during calcination and was utilized in an amount of 10 wt %. Nickel-cerium oxide was used as hydrogen sulfide control agent and was utilized in an amount of 3.8 wt %. An oxygen storage material comprising 58.5 wt % zirconium oxide plus hafnium oxide, 31.5 wt % cerium oxide, 5 wt % lanthanum oxide, and 5 wt % yttrium oxide was utilized. The oxygen storage material constituted 40.0 wt % of the total weight of the washcoat. The catalytically active materials (platinum and rhodium) were present in an amount of 0.5 wt %, based upon the total weight of the washcoat. Alumina in an amount of 40.5 wt % constituted the remainder of the washcoat.

A slurry was prepared for coating of ceramic substrates. Barium sulfate was initially added to water with a small amount of concentrated nitric acid (nitric level was calculated as 1 wt % of the alumina to be used in the preparation). The oxygen storage component was then added slowly with stirring, followed by the alumina component. The resultant slurry was stirred for 30 minutes. The nickel oxide/cerium oxide component was then added followed by sugar as 10 wt % of the total solids. The resultant slurry was then milled on a Sweco vibratory mill to a mean value of greater than 2 micrometers; $d_{90}$ of 5 to 7 micrometers and 100% pass less than 25 micrometers. The slurry was then weighed and the LOI (loss on ignition) at 540° C. measured. From this was calculated the amount of platinum (Pt) and rhodium (Rh) to be added to the slurry. The platinum was added initially in the form of platinum nitrate by slowly dripping the platinum solution into the slurry vortex while stirring. Rhodium was then added as rhodium nitrate in a similar fashion. The slurry was then stirred for a minimum of 1 hour before applying to the ceramic honeycomb.

Ceramic monoliths of 400 cells per square inch were coated by dipping one end of the monolith into the slurry and drawing the slurry up into the channels using a vacuum. The monolith was then removed from the slurry and the channels cleared by applying a vacuum to the other end of the monolith. The washcoat loading was controlled by varying the specific gravity and coating parameters such as vacuum time and the amount of slurry drawn into the channels. After applying the washcoat the catalysts were calcined at 540° C. for 2 hours or alternatively dried using electromagnetic heating as described in the Examples below. The total washcoat loading after calcination was 2.64 g/in$^3$. The coated substrate was then treated as described in the individual examples.

Example 1

In this example, the impact of dielectric drying and calcining via convection on catalyst performance were compared for single layer catalysts wherein the catalytically active metals are platinum and rhodium. Four samples were prepared in accordance with Table 1 wherein the ratio of active platinum to rhodium in the catalyst composition was 3:1 by weight. The platinum plus rhodium loading was 25.0 grams per cubic foot (g/ft$^3$) at 3:0:1. The composition of the catalysts is defined based on total precious metal per geometric volume plus the ratio of the metals in the order of Pt, palladium (Pd), and Rh (Pt:Pd:Rh). Here the Pd was 0 as we have no Pd so the weight ratio is 3:0:1.

TABLE 1

| Sample No. | Catalytic Metal Precursor | Heating Technique | Temperature (° C.) and time (hrs) |
|---|---|---|---|
| 1 | platinum nitrate/ rhodium nitrate | CC[1] calcination | 540° C. for 2 hrs |
| 2 | platinum nitrate/ rhodium nitrate | RF[2] drying; no calcination | 80° C. for 15 min. |
| 3 | platinum hexahydroxy ethanolamine/rhodium nitrate | CC calcination | 540° C. for 2 min. |
| 4 | platinum hexahydroxy ethanolamine/rhodium nitrate | RF drying; no calcination | 80° C. for 15 min. |

[1]CC means convection/conduction
[2]RF means radio frequency

Each of the samples were then tested by independently mounting the respective samples in the exhaust stream of a 2.2 liter swept volume, 4 cylinder, national low emission vehicle (NLEV), SATURN vehicle (commercially available from General Motors Co. Detroit, Mich.). During the test, the washcoat in each case was heated to a temperature greater than 100° C. Thus, for the electromagnetically dried catalyst compositions the final calcination step took place in the exhaust stream of the vehicle. This test, commonly called the Federal Test Procedure (FTP), measures the mass of pollutants in the exhaust gas—HC, CO, and NOx. These pollutants are measured while simulating a typical trip in city driving. It involves a series of starts, stops, idles, accelerations, and decelerations, at varying speeds and rates. Testing is done on a dynamometer with a horsepower load based on the size and weight of the vehicle. During the test the tailpipe and engine out emissions are collected and measured and the emissions are integrated over the complete cycle.

Figure 2:
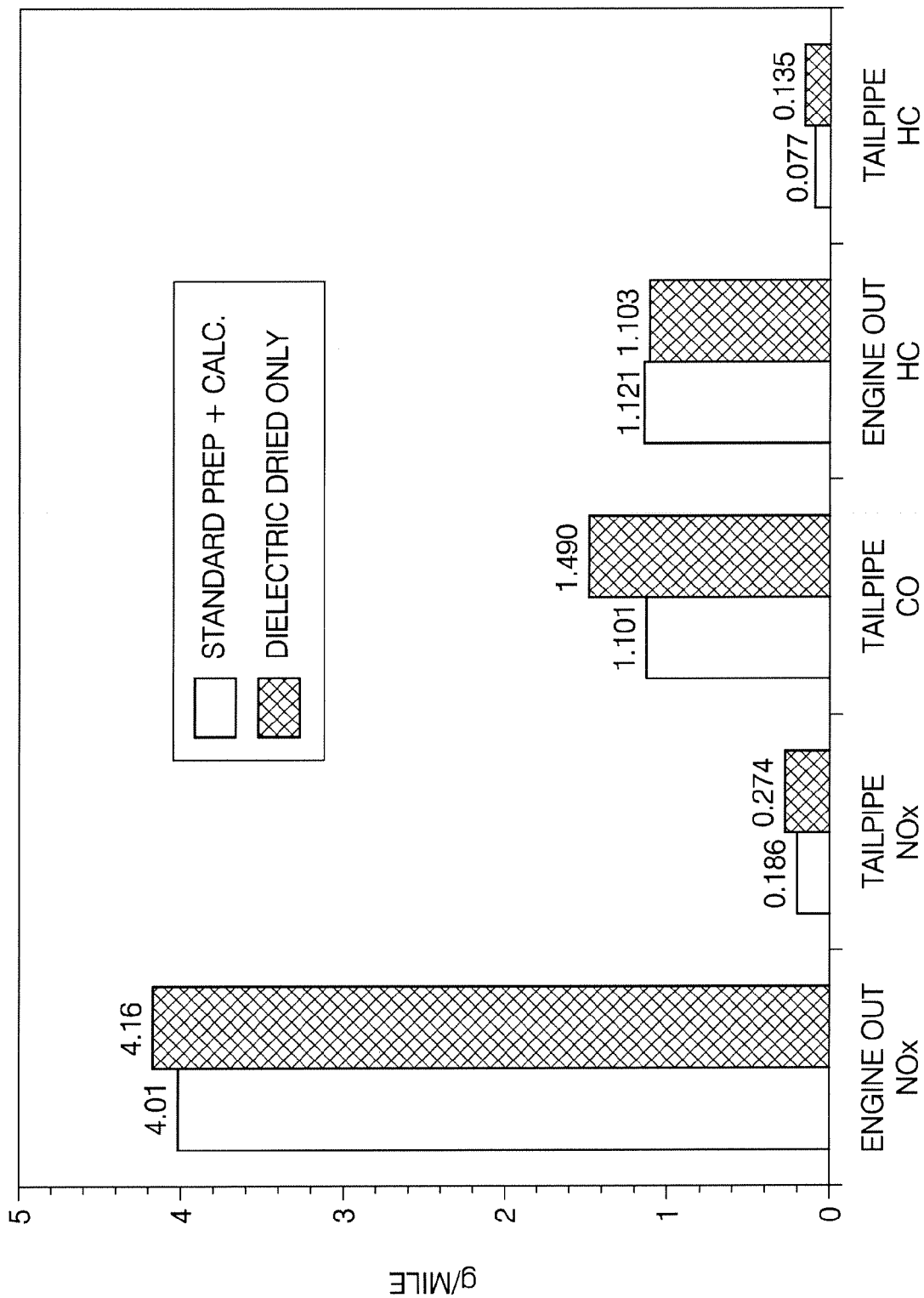
FIG. 2 is a bar graph comparing nitrogen oxides (NOx), carbon monoxide (CO), and hydrocarbon (HC) emissions for calcined catalyst compositions using convectional heating versus those dried using electromagnetic heating for a first Federal Test Procedure (FTP), when the catalytically active metal precursors are rhodium nitrate and platinum hexahydroxy ethanolamine.

FIG. 1 compares the 1$^{st}$ FTP test for Sample 1 (the clear bars) with Sample 2 for NOx, CO, and hydrocarbon (HC) emissions of the vehicle. Similarly, FIG. 2 compares Sample 3 (the clear bars) with Sample 4 for NOx, CO, and HC emissions of the vehicle. From these figures, it can clearly be seen that there is no significant difference in the emission ratios for catalyst compositions calcined using conduction/convection and those that were dried via electromagnetic heating and were not calcined prior to introduction into the exhaust stream. Most noteworthy is the fact that the difference in tailpipe NOx emissions was trivial even though the catalyst precursors, comprising nitrate, were decomposed in the stream.

Example 2

Figure 3:
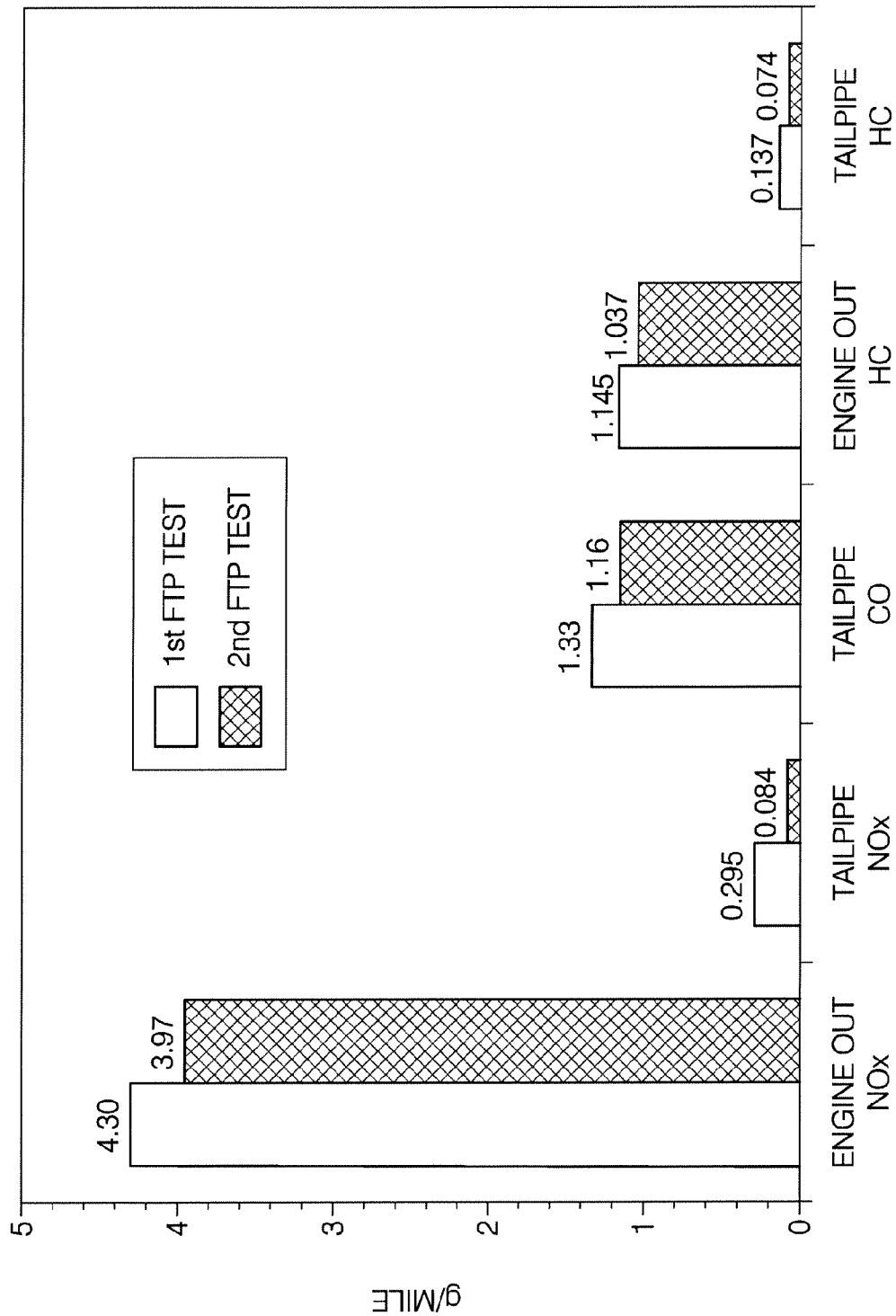
FIG. 3 is a bar graph comparing first and second FTP test results for nitrogen oxides (NOx), carbon monoxide (CO), and hydrocarbon (HC) emissions for electromagnetically dried catalyst compositions when the catalytically active metal precursors are rhodium nitrate and platinum nitrate.
Figure 4:
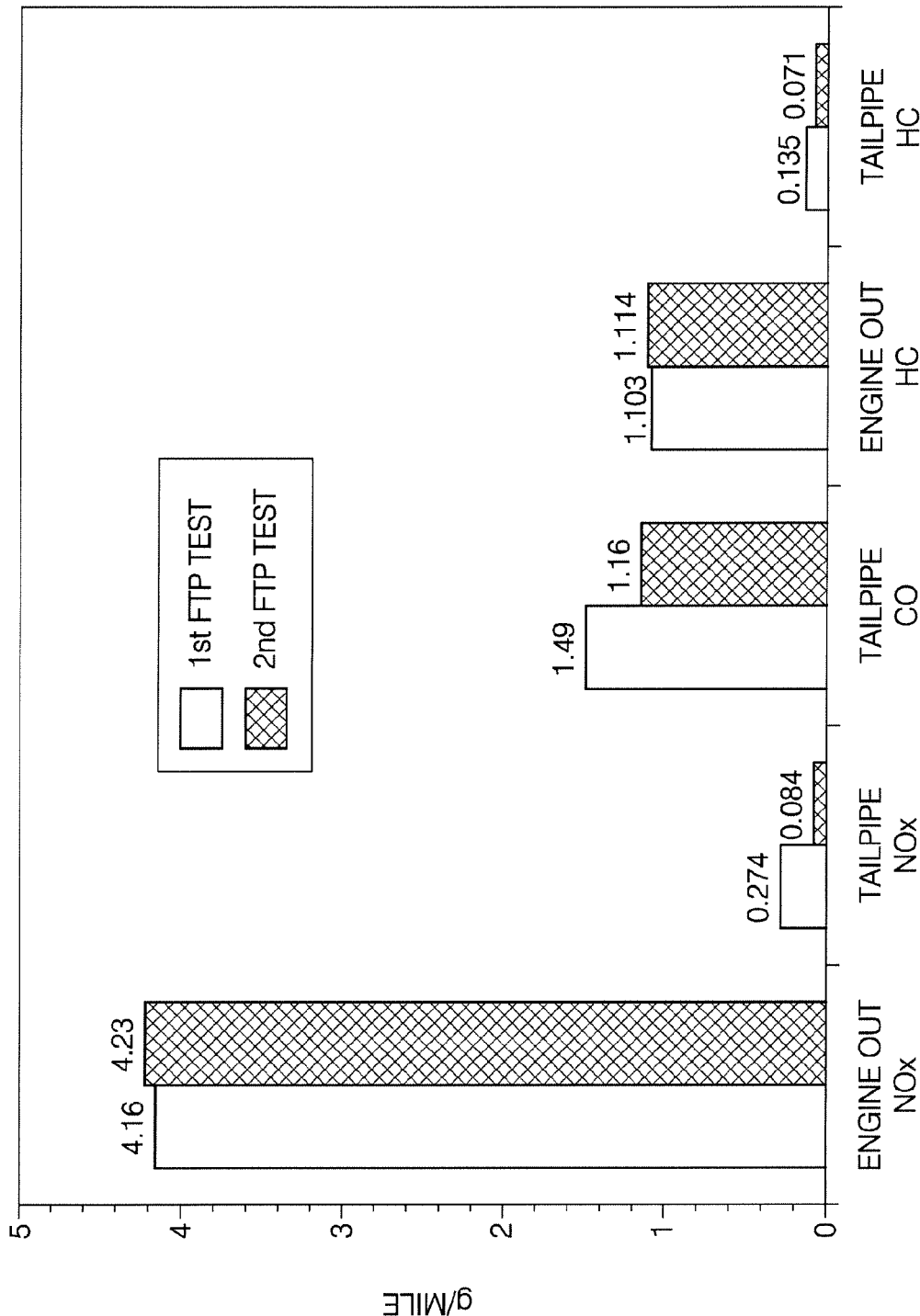
FIG. 4 is a bar graph comparing first and second FTP test results for nitrogen oxides (NOx), carbon monoxide (CO), and hydrocarbon (HC) emissions for electromagnetically dried catalyst compositions when the catalytically active metal precursors are rhodium nitrate and platinum hexahydroxy ethanolamine.

In this example, two successive FTP tests were conducted on the electromagnetically dried catalyst composition in order to determine whether the process of undergoing the final calcining step on the vehicle produced any significant difference in emissions between the first FTP test and the second FTP test. The results for Sample 2 are shown in FIG. 3 and the results for Sample 4 are shown in FIG. 4. Both figures show very little difference in engine to tailpipe emissions clearly indicating that electromagnetic drying of the catalyst compositions followed by calcination in the exhaust stream of the vehicle does not result in excessive emissions.

Example 3

Figure 5:
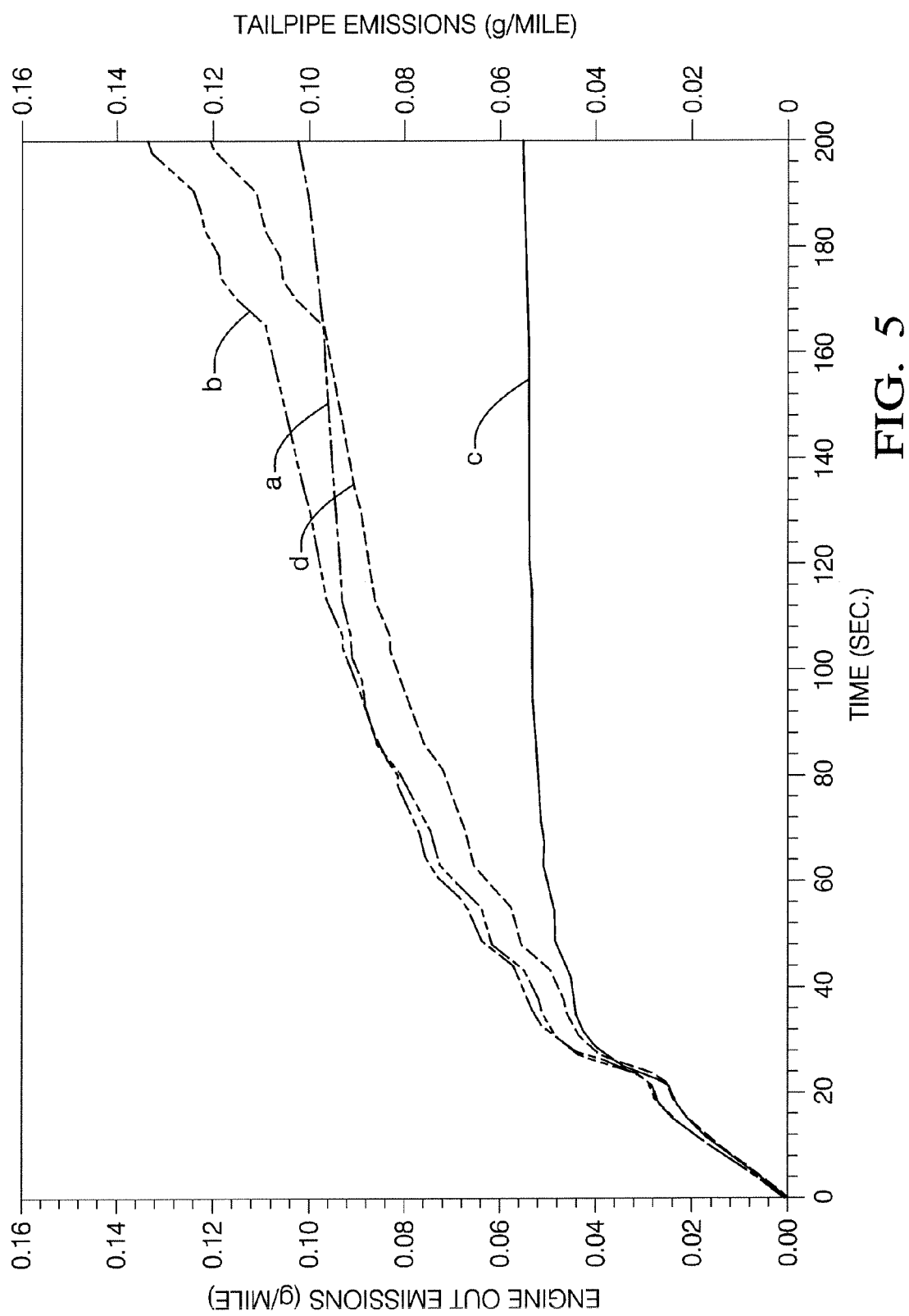
FIG. 5 is a graph comparing first and second FTP test results in the engine output and tailpipe emissions for non-methane hydrocarbon (NMHC) emissions when the electromagnetically heated catalyst composition is calcined in the exhaust stream of a vehicle.
Figure 6:
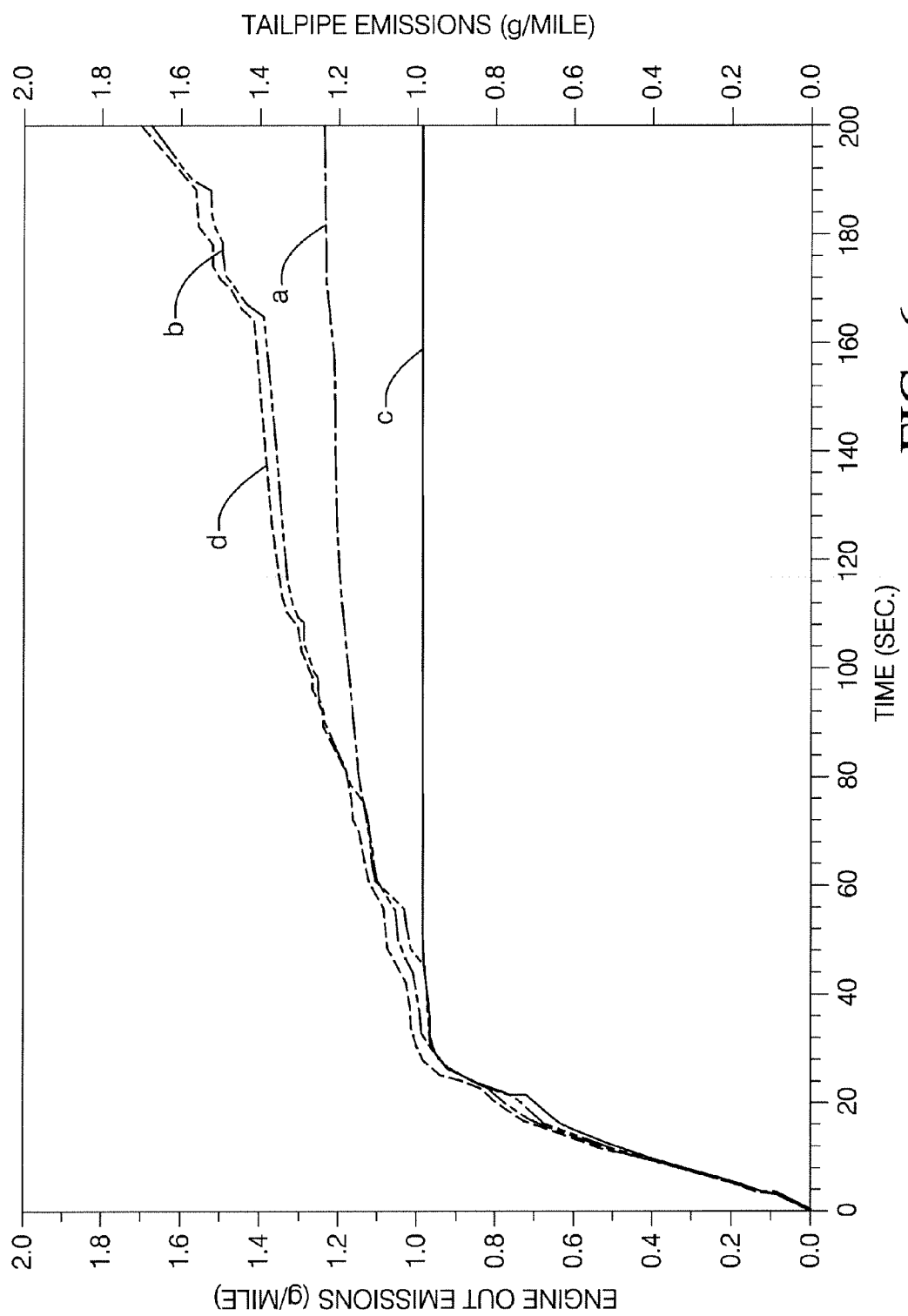
FIG. 6 is a graph comparing first and second FTP test results in the engine output and tailpipe emissions for carbon monoxide emission when the electromagnetically dried catalyst composition is calcined in the exhaust stream of a vehicle.
Figure 7:
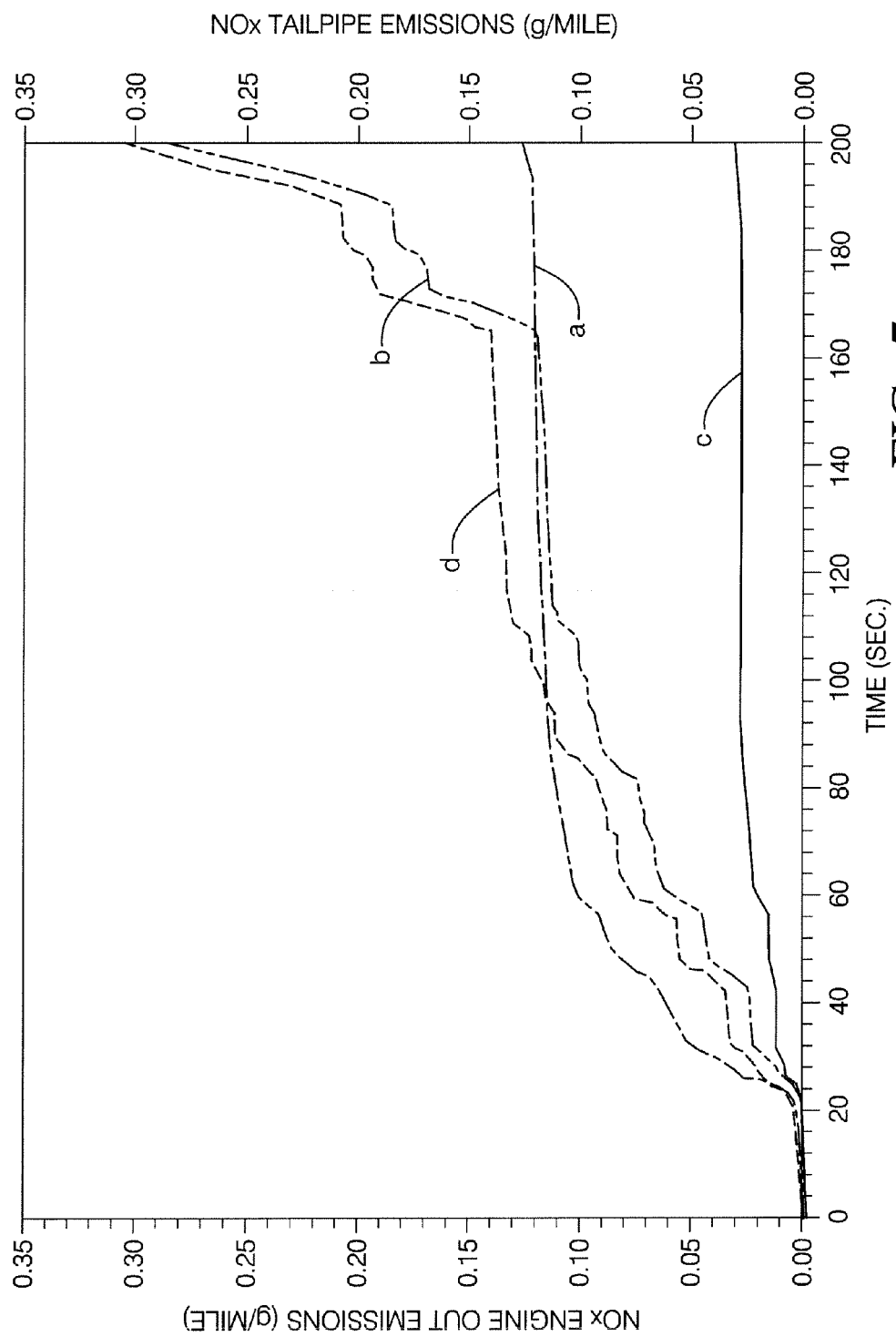
FIG. 7 is a graph comparing first and second FTP test results in the engine output and tailpipe emissions for NOx emission when the electromagnetically dried catalyst composition is calcined in the exhaust stream of a vehicle.

In this example, the second-by-second emissions were measured for engine and tailpipe emissions over the first 200 seconds for the first and second FTP tests for non-methane hydrocarbons (NMHC), CO, and NO$_x$ for Sample 2 with the results illustrated in FIGS. 5, 6 and 7. In the FIGS. 5, 6 and 7 respectively, data represented by lines "a" represents the first FTP test, tailpipe, line "b" represents the first FTP test, engine out, line "c" represents the second FTP test, tailpipe, and line "d" represents the second FTP test, engine out. While the data reveals a slight increase in the tailpipe emissions for the first FTP test as the temperature increases from about 200° C. to about 500° C., this emission increase is small, namely less than a 3.6% difference when compared to the engine out emissions. This result suggests that during the initial heat up of the catalyst composition to 500° C., the NMHC, CO, and NOx decomposition products of sugar, nitric acid and platinum group metal (PGM) nitrates or amine complexes in the electromagnetically dried washcoat are converted to carbon dioxide, water and nitrogen respectively. This therefore indicates that the decomposition products are sufficiently low in concentration and thus will have little impact on the normal vehicle tailpipe emission levels. The normal practice for testing fresh catalysts by original equipment manufacturers (OEMs) is to initially run one or more de-greening FTP tests before FTP testing with data collection. Thus, these initial tests will bring about the initial calcination of the electromagnetically dried catalysts on the vehicle and thus will have no impact on actual FTP testing results of the fresh catalysts.

The observation that NOx emissions will be low makes it feasible to put the catalyst on the vehicle after only electromagnetic drying despite the absence of an initial calcination step. This distinct advantage of calcination on the vehicle arises from the fact that the vehicle starts up in an open loop state with respect to engine calibration, i.e., the engine is operated fuel rich until the engine management system goes closed loop. This will result in the exhaust having an excess of hydrocarbon, carbon monoxide and hydrogen, which will have the beneficial effect of consuming NO$_x$ especially in the form of nitrogen oxide and in the activation of the precious metals through reduction to the metallic state. Thus catalysts that are dried using electromagnetic heating (e.g., radio frequency) and subsequently calcined (and preferably reduced) on the vehicle have the potential of producing a higher performance compared with those calcined in air or an oxidizing atmosphere as occurs in calcination processes involving convectional heating.

Example 4

In this example, the impact of severe fuel cut aging on performance is examined. In order to measure the impact of fuel cut aging on performance, several tests were carried out including light-off and A/F traverse tests. This fuel cut aging cycle consisted of two modes. The first was a 300 second cruise in which the engine operated rich with secondary air injection to give a stoichiometric exhaust gas composition at the catalyst inlet. The second mode was 320 seconds long. This mode also operated with the engine running rich with secondary air injection, but every 30 seconds a fuel cut occurred. During the cruise mode the exhaust gas composition was at stoichiometry at the catalyst inlet, the inlet temperature was 675° C., with a bed temperature of 1,000° C.

The second aging cycle used was run on a Chevy 7.4 L V-8 engine. The cycle consisted of two modes each 300 seconds in length. The $1^{st}$ mode consisted of a rich cruise with a catalyst inlet temperature of 550° C., a bed temperature of 575° C., and an exhaust A/F ratio of 11.6. For the $2^{nd}$ mode the engine was again run under rich conditions, but air was injected at the catalyst inlet such that the A/F ratio seen by the catalyst was 15.3. The catalyst inlet temperature was 470° C., while the bed temperature was 1,025° C.

The light-off test consisted of measuring the conversion efficiencies as a function of inlet temperature on a monolithic catalyst core. The temperature and time at which the CO, HC, or $NO_x$ conversion efficiency reached 50% is generally defined as the light-off temperature and light-off time respectively. The light-off and A/F traverse activity measurements were done as follows. Light-off testing was done on a Ford 5.0 L MPFI engine. The engine speed was 1,800 RPM with catalyst inlet CO, $O_2$, NOx, and HC concentrations of 0.62 wt %, 0.6 wt %, 1,800 parts per million (ppm), and 1,900 ppm, respectively, based upon the total weight of the gas entering the catalyst. The mean A/F ratio during the test was 14.56 with an A/F oscillation amplitude of ±0.65 at a frequency of 1.0 Hz. The temperature ramp was generated by diverting the exhaust through a heat exchanger. The temperature traverse ramp consisted of a ramp from 200° C. to 450° C. at a rate of 51° C. per minute with a GHSV (gas hourly space velocity) of 35,000 $hr^{-1}$.

Two types of A/F traverse test were carried out. The first test was done at a catalyst inlet temperature of 400° C. and a GHSV of 35,000 $hr^{-1}$. Again a 5.0 L Ford MPFI engine was used for the test at an engine speed of 1,800 RPM. The traverse test consisted of a continuous A/F sweep from A/F of 15.2 to 13.8 at 0.131 A/F units per minute. During the test the A/F modulation was ±0.65 A/F units at a frequency 1 Hz. The second A/F traverse test was run in a similar manner but under different conditions of temperature, GHSV, and A/F modulation. The catalyst inlet temperature was 482° C., the A/F modulation was ±0.8 at 1 Hz, and the GHSV was 49,000 $hr^{-1}$.

Figure 8:
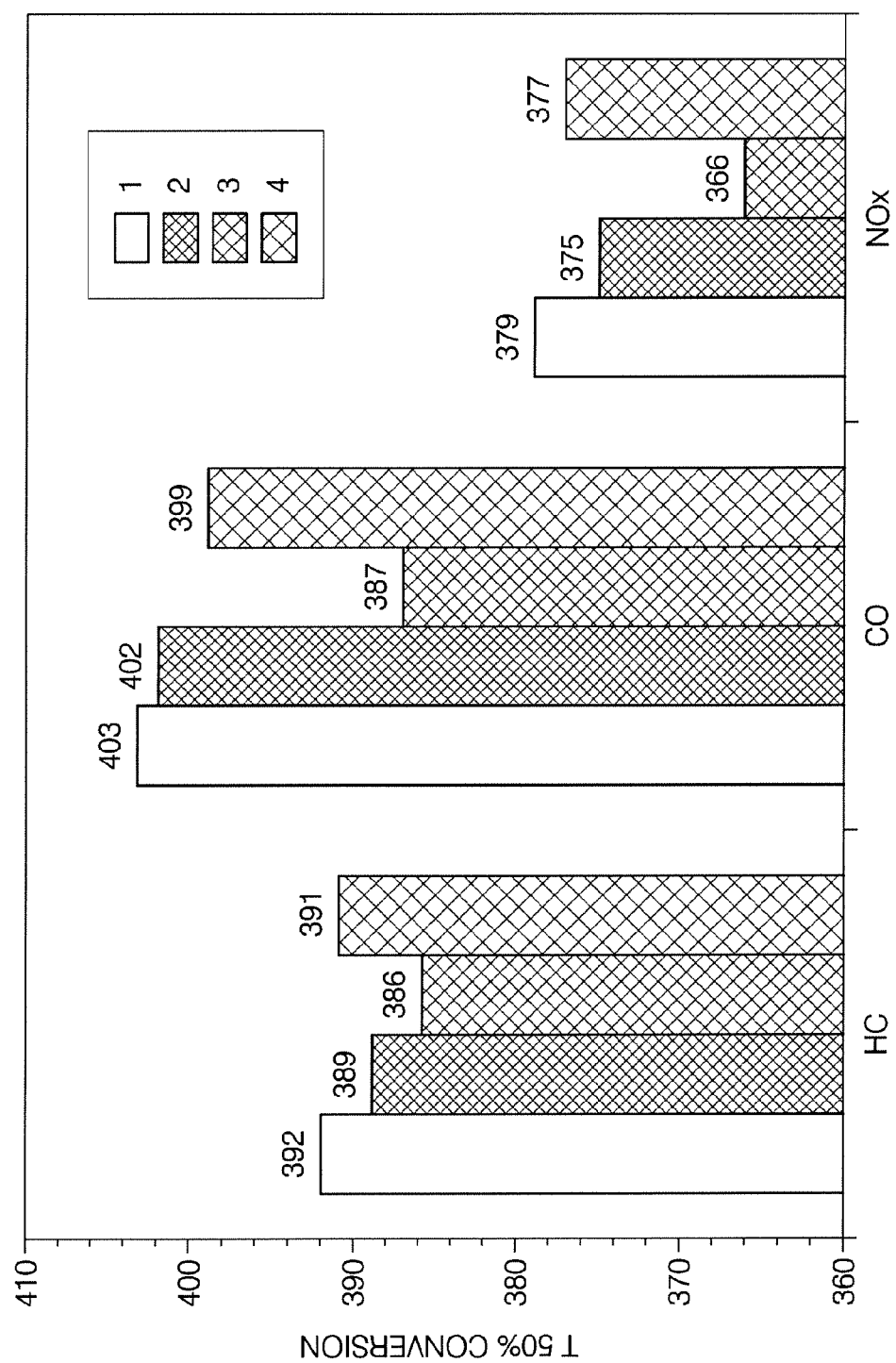
FIG. 8 is a bar graph comparing light-off performance temperatures (T) at 50% conversion (after 50 hours of fuel cut aging with a maximum bed temperature of 1,000° C.) for HC, CO, and NOx emissions for calcined catalyst compositions using convectional heating versus those dried electromagnetically.

FIG. 8, reflects the light-off temperatures at 50% conversion for HC, CO, and $NO_x$, when the aging had occurred for 50 hours. As can be seen, after 50 hours of aging there is little difference in the light-off performance between catalyst compositions, which have been calcined by convectional heating means and those, which have been dried by electromagnetic heating.

Figure 9:
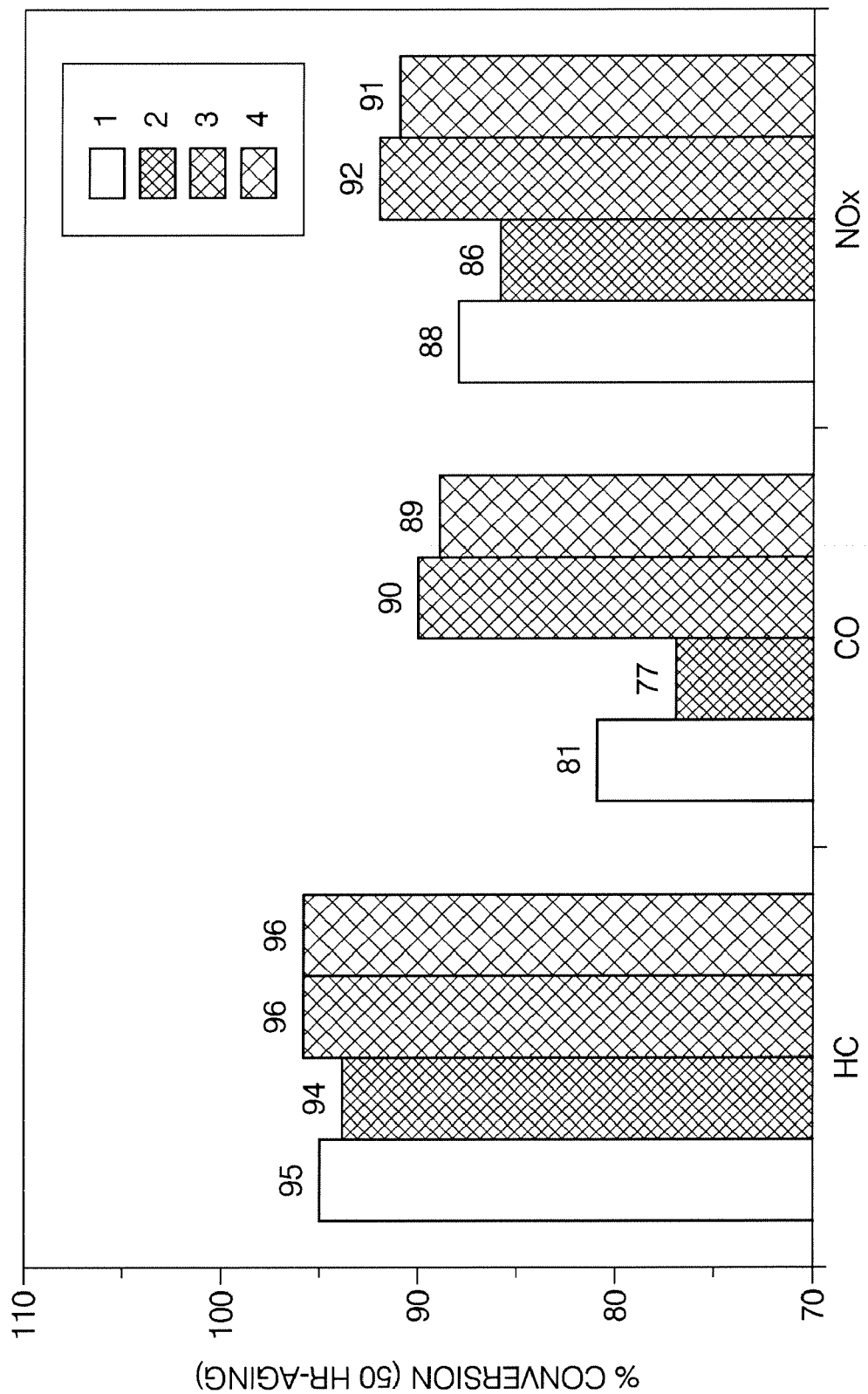
FIG. 9 is a bar graph comparing percent (%) conversion (after 50 hours of fuel cut aging with a maximum bed temperature of 1,000° C.) for HC, CO, and NOx emissions for calcined catalyst compositions using convectional heating versus those dried electromagnetically.
Figure 10:
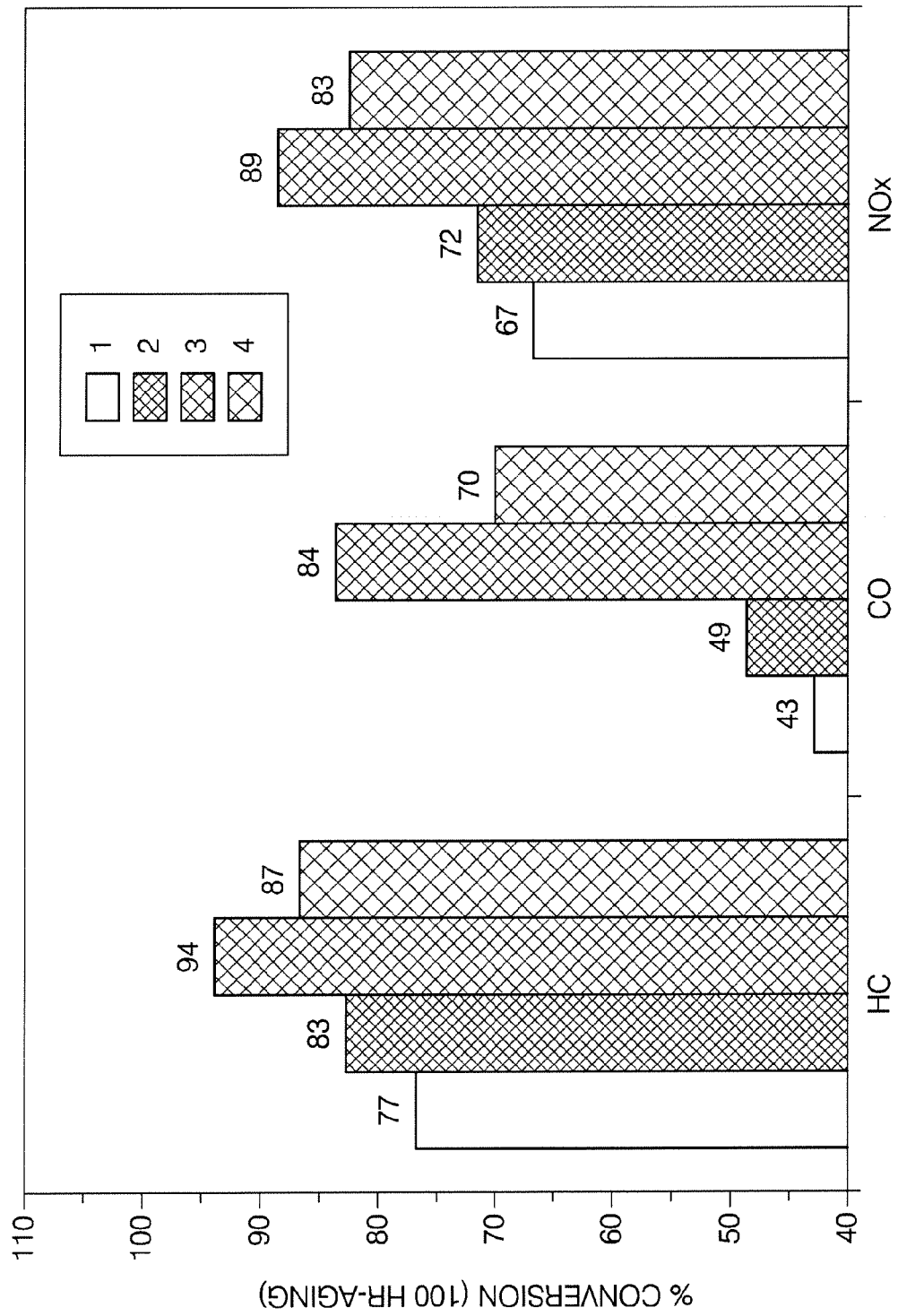
FIG. 10 is a bar graph comparing percent conversion (after 100 hours of fuel cut aging with a maximum bed temperature of 1,000° C.) for HC, CO, and NOx emissions for calcined catalyst compositions using convectional heating versus those dried electromagnetically.

FIGS. 9 and 10 reflect the percentage conversion of HCs, CO, and $NO_x$ after 50 hours and 100 hours of aging, respectively. While FIG. 9 shows little effect on traverse activity, i.e., it does not reflect any significant difference in the conversion of the HCs, CO, and $NO_x$ depending upon catalyst preparation, some differences are observed at 100 hours of aging as shown in FIG. 10. These differences reflect lower levels in platinum group metal content measured for this electromagnetically dried catalyst.

Example 5

Figure 11:
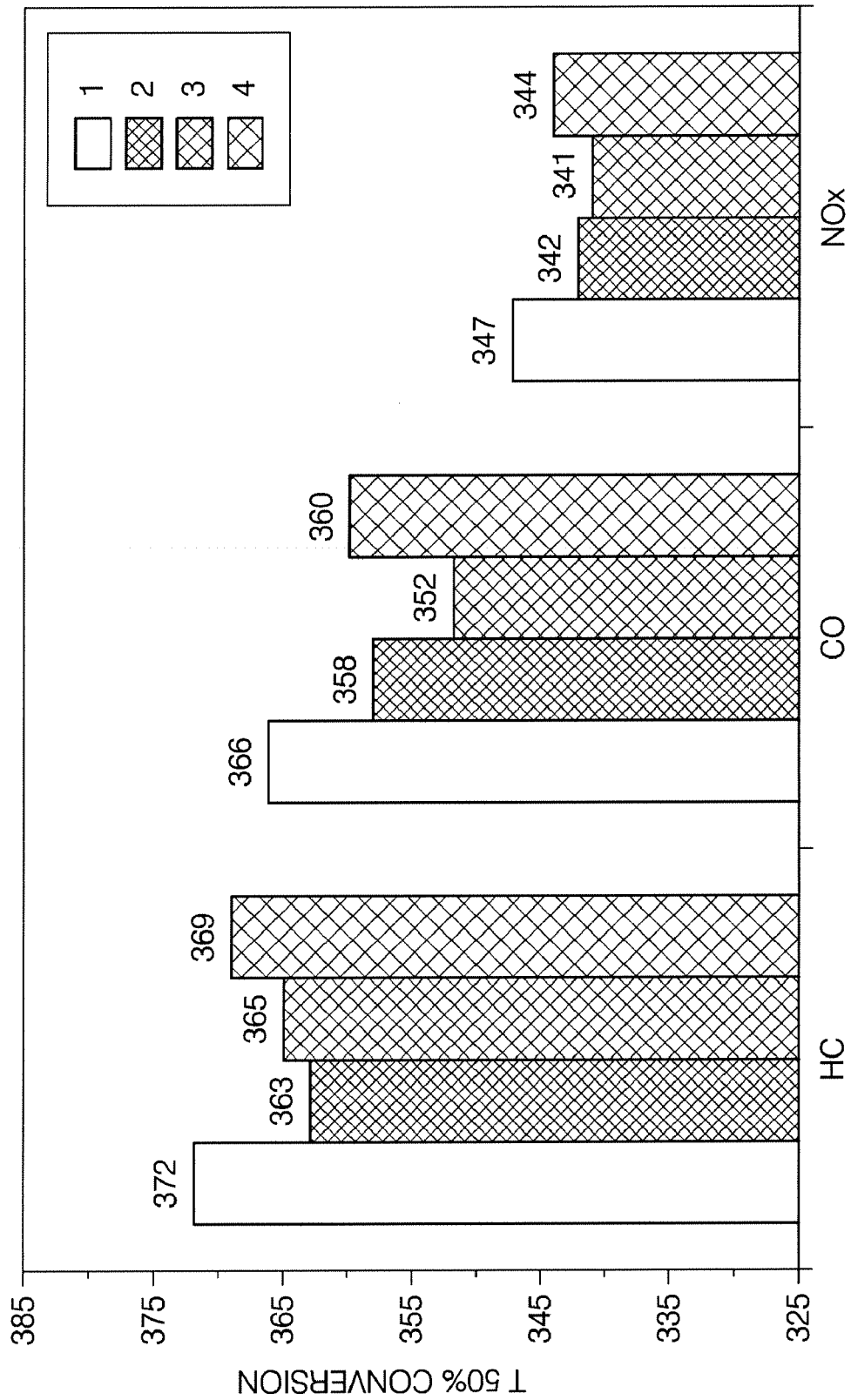
FIG. 11 is a bar graph comparing light-off performance temperatures at 50% conversion (after 100 hours of a hot lean aging with maximum bed temperature of 1,025° C.) for HC, CO, and NOx emissions for calcined catalyst compositions using convectional heating versus those dried electromagnetically.
Figure 12:
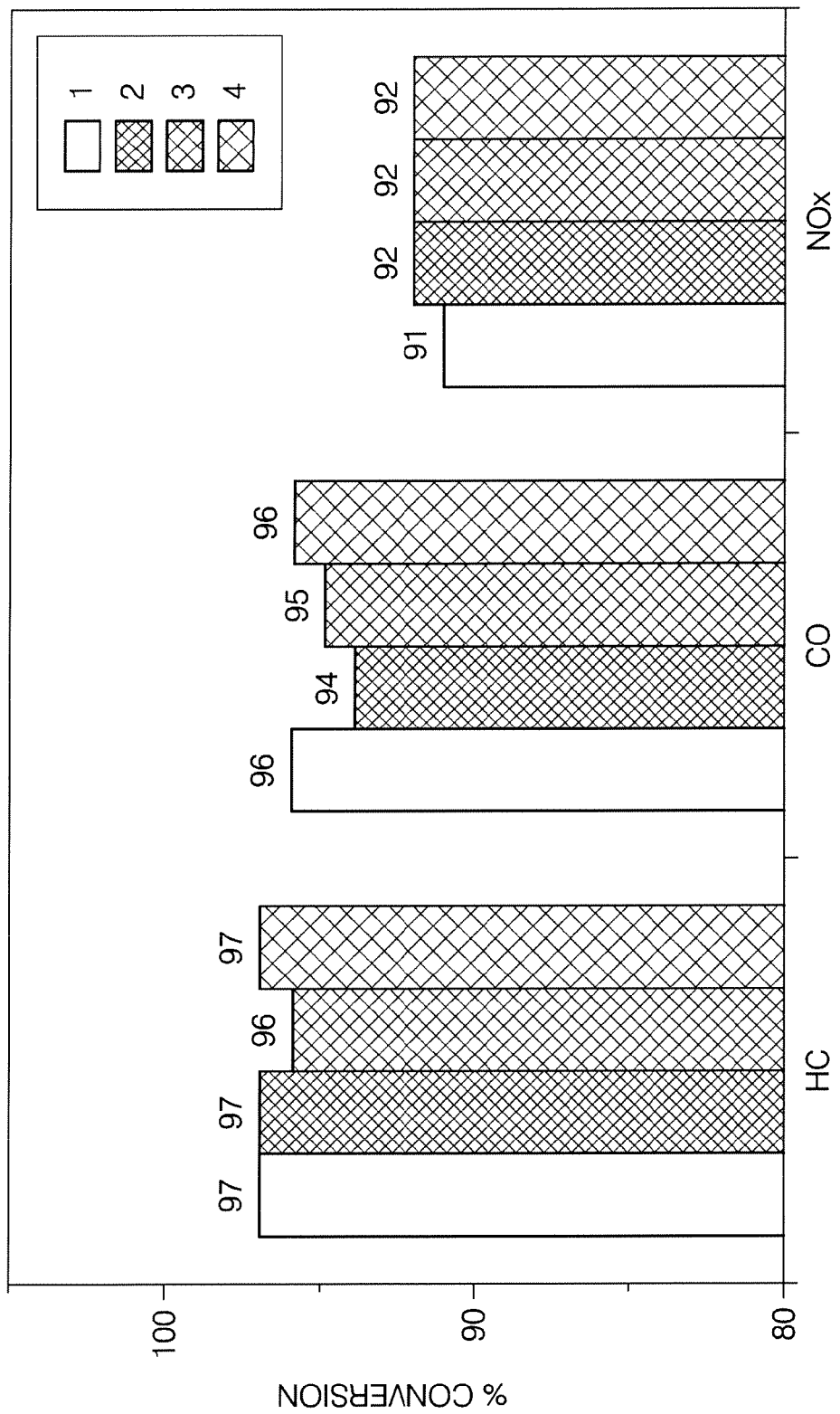
FIG. 12 is a bar graph comparing the percent conversion of HC, CO, and NOx emissions (after 50 hours of a hot lean aging with a maximum bed temperature of 1,025° C.) for calcined catalyst compositions using convectional heating versus those dried electromagnetically.
Figure 13:
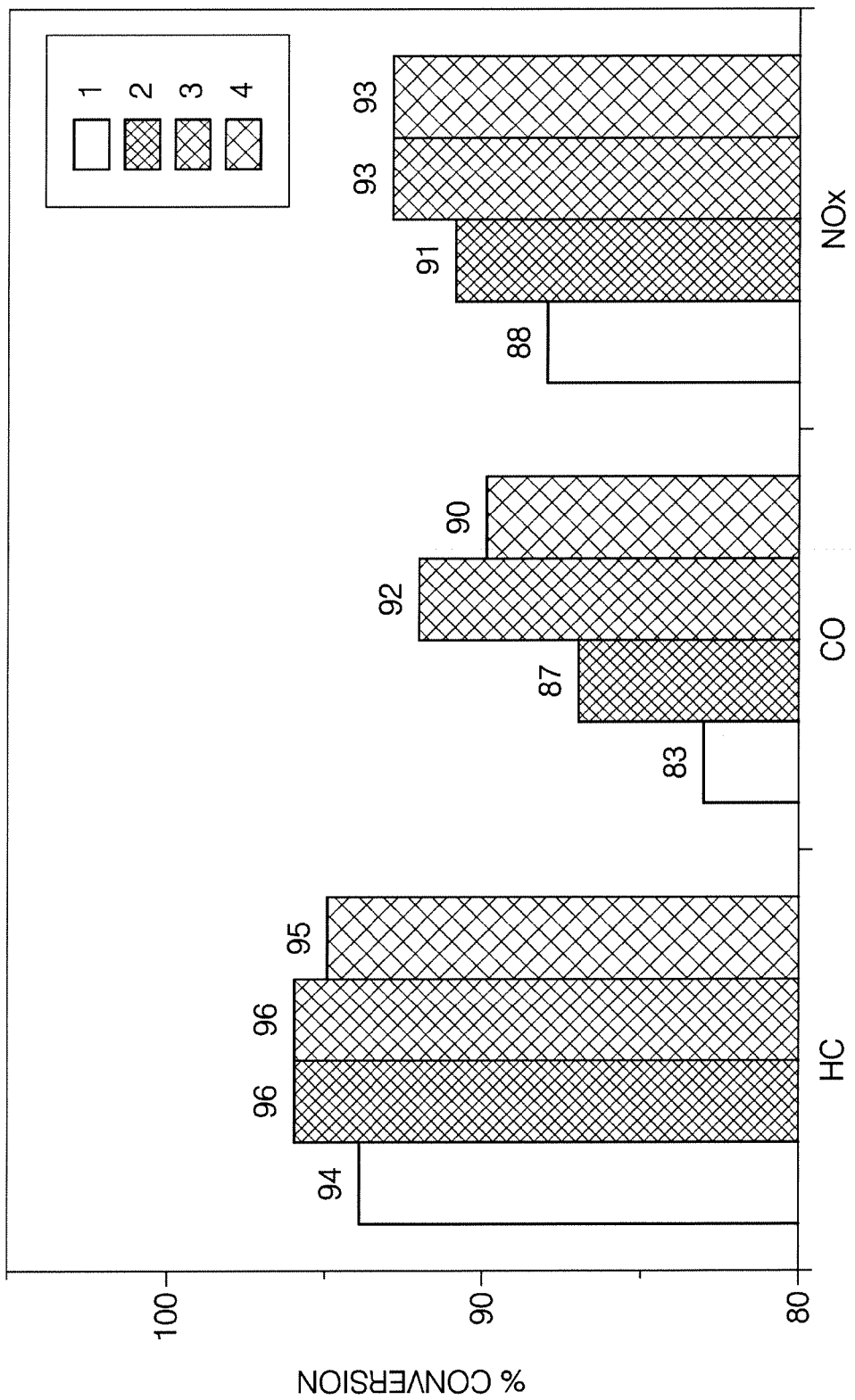
FIG. 13 is a bar graph comparing the percent conversion of HC, CO, and NOx emissions (after 100 hours of a hot lean aging with a maximum bed temperature of 1,025° C.) for calcined catalyst compositions using convectional heating versus those dried electromagnetically.
Figure 14:
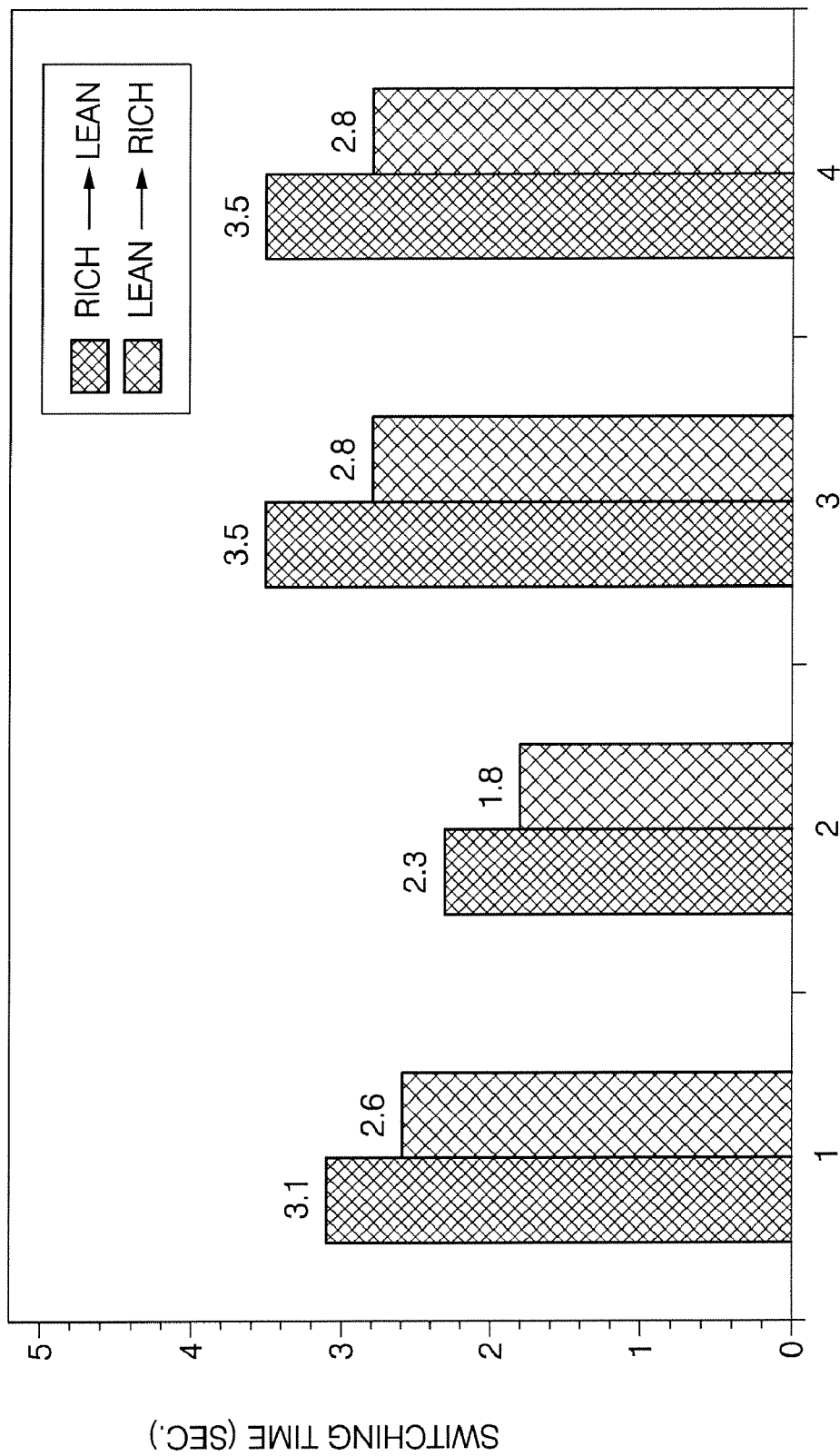
FIG. 14 is a bar graph comparing switching time for rich to lean fuel mixtures at 50 hours of a hot lean aging, with a maximum bed temperature of 1,025° C., for calcined catalyst compositions using convectional heating versus those dried electromagnetically.

The impact of hot lean aging at a maximum bed temperature of 1,025° C. on catalyst performance is shown in FIGS. 11, 12, 13 and 14. FIG. 11 shows no measurable impact on catalyst light-off after 100 hours of aging while FIGS. 12 and 13 show no impact on traverse activity. No significant impact on the oxygen storage capacity (OSC) properties of the catalysts were also observed as shown in FIG. 14 for the OSC measurements after 50 hours of aging. This test measures the oxygen storage properties of the catalyst on an engine dynamometer at 550° C. Heated EGO sensors are placed before and after the catalyst. The A/F ratio is switched between 13.82 and 15.3. When the signal from the second sensor crosses 450 millivolts (mv), the A/F ratio is switched. Data from the sensors is collected at 20 Hz for 50 seconds. The time delays for switching from rich to lean and lean to rich are measured for the EGO sensors. The longer the delay time (switching time) the higher the OSC capacity of the catalyst.

Example 6

In this example, the catalytically active metals were applied in two layers to the catalyst composition. The first coating comprising platinum nitrate was applied to the substrate in a first pass followed by either calcination using convectional heating or electromagnetic drying, while a second coating comprising rhodium nitrate was applied in a second pass following which the multilayered catalyst composition was subjected to only calcination by convectional heating. The substrate used was a 400 cell density ceramic, 4 inches round diameter×6 inches long (volume of 75 cubic inches ($in^3$)). The wt % of Pt on the support was 0.42 wt % and Rh was 0.1 wt %, based upon the total weight of the catalyst on the support. The density of the multilayered platinum/rhodium catalyst complex was 28.6 g/$ft^3$, while the ratio of active platinum to rhodium was 4.1:0:1. In Table 2 is summarized the washcoat compositions for the multilayered Pt/Rh catalyst. The multi-layered catalyst compositions were subjected to tests similar to those detailed above in Examples 1-5 and these will be discussed in detail below. Samples 5 and 8 represented an earlier, less advanced technology, the only difference being that the first layer of Sample 5 was dried by dielectric drying while both layers of Sample 8 were calcined by conduction/convection. Samples 6 and 7 represented more advanced technologies with newer materials and greater durability. For this technology pair the first layer of Sample 7 was dielectrically dried while both layers of Sample 6 were calcined using convection/conduction.

TABLE 2

| | Drying Technique | |
|---|---|---|
| Sample No. | Platinum Layer | Rhodium layer |
| 5 | Dielectric Drying | Calcination by convection. |
| 6 | Calcination by convection. | Calcination by convection. |
| 7 | Dielectric Drying | Calcination by convection. |
| 8 | Calcination by convection. | Calcination by convection. |

Figure 15:
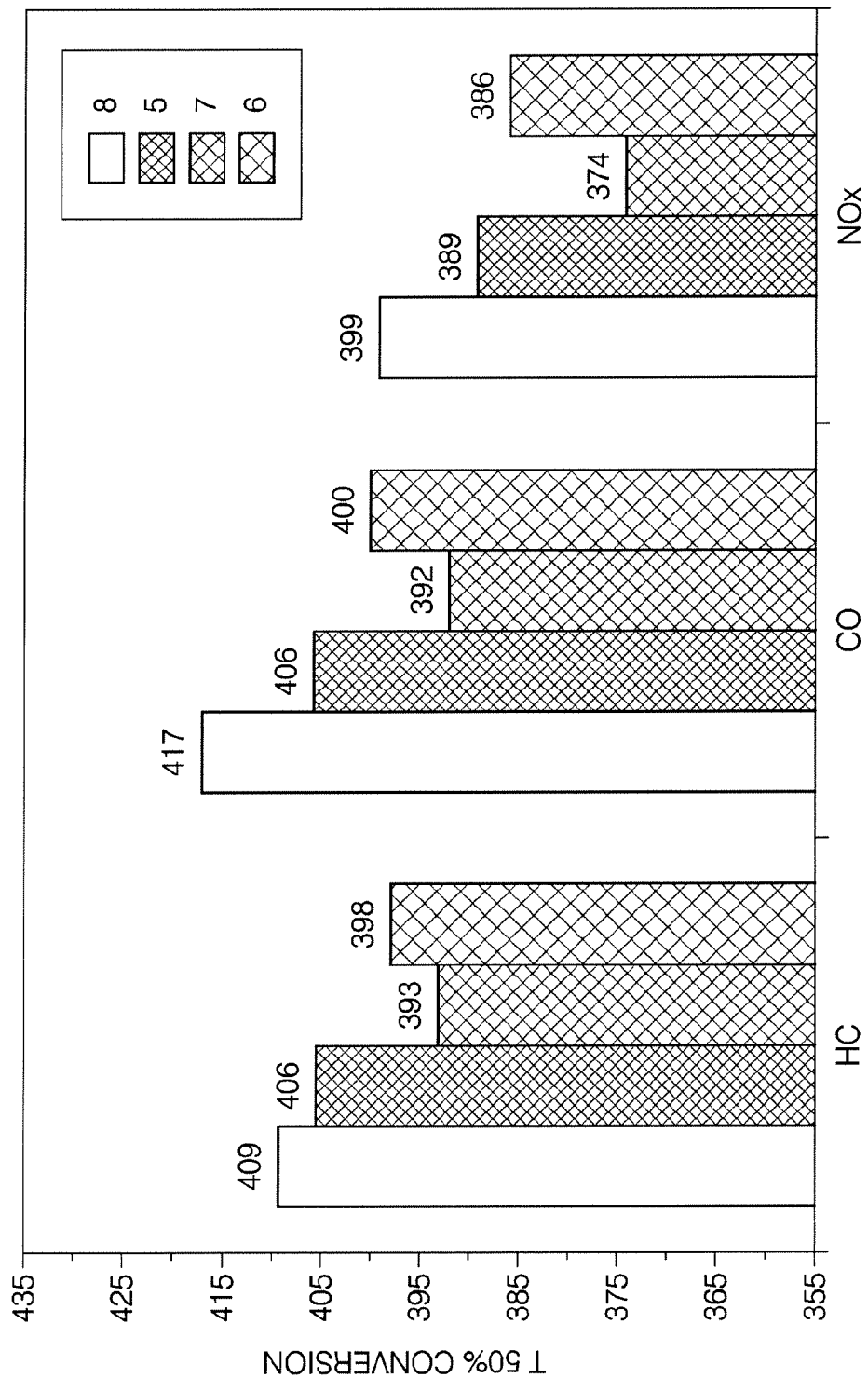
FIG. 15 is a bar graph comparing light-off performance temperatures at 50% conversion (after 100 hours of fuel cut aging with a maximum bed temperature of 1,000° C.) for HC, CO, and NOx emissions for 2-layer/2-pass calcined catalyst compositions using convectional heating versus those dried electromagnetically.
Figure 16:
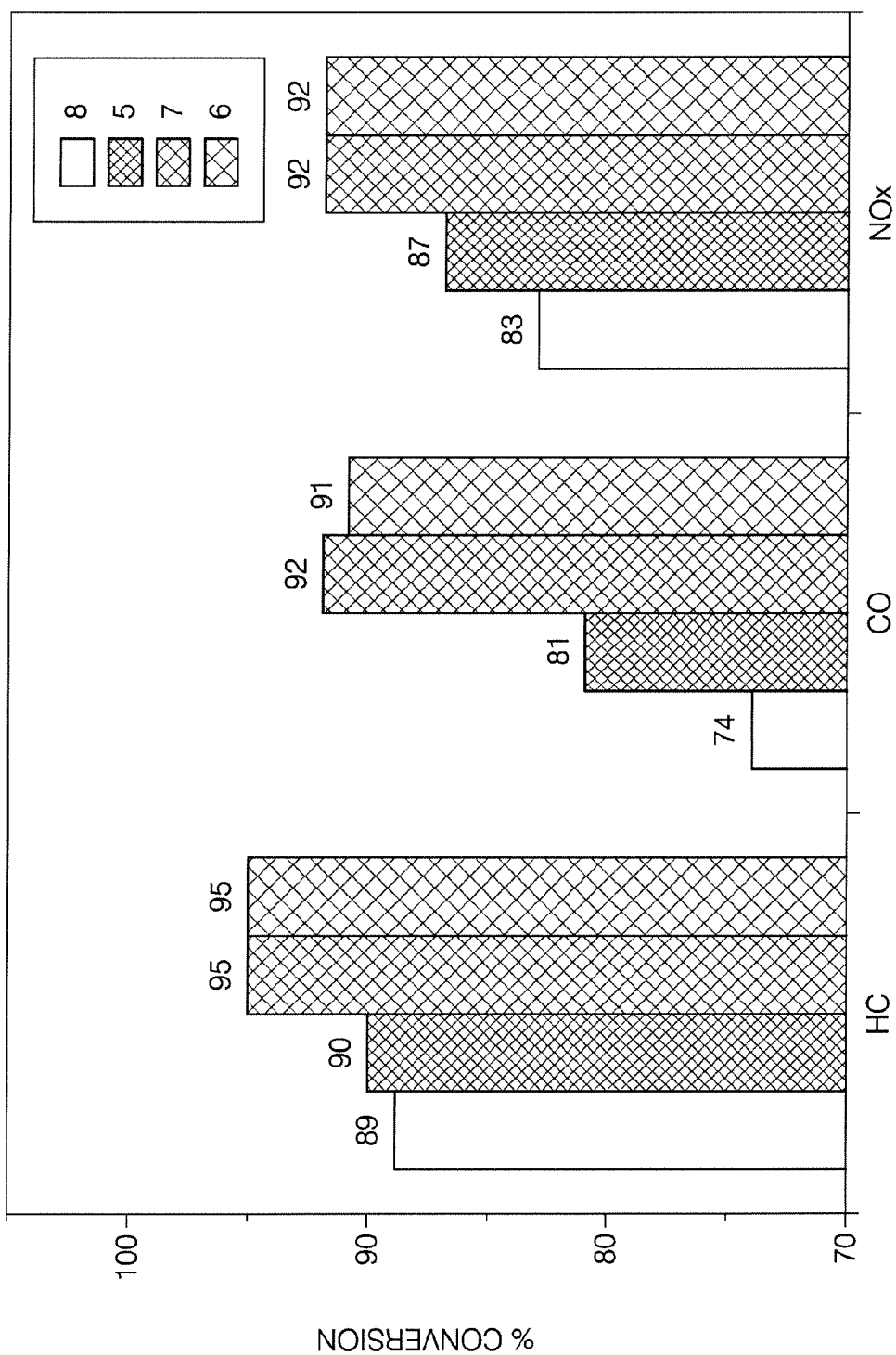
FIG. 16 is a bar graph comparing the percent conversion of HC, CO and NOx emissions (after 100 hours of fuel cut aging with a maximum bed temperature of 1,000° C.) for 2-layer/2-pass calcined catalyst compositions using convectional heating versus those dried electromagnetically.
Figure 17:
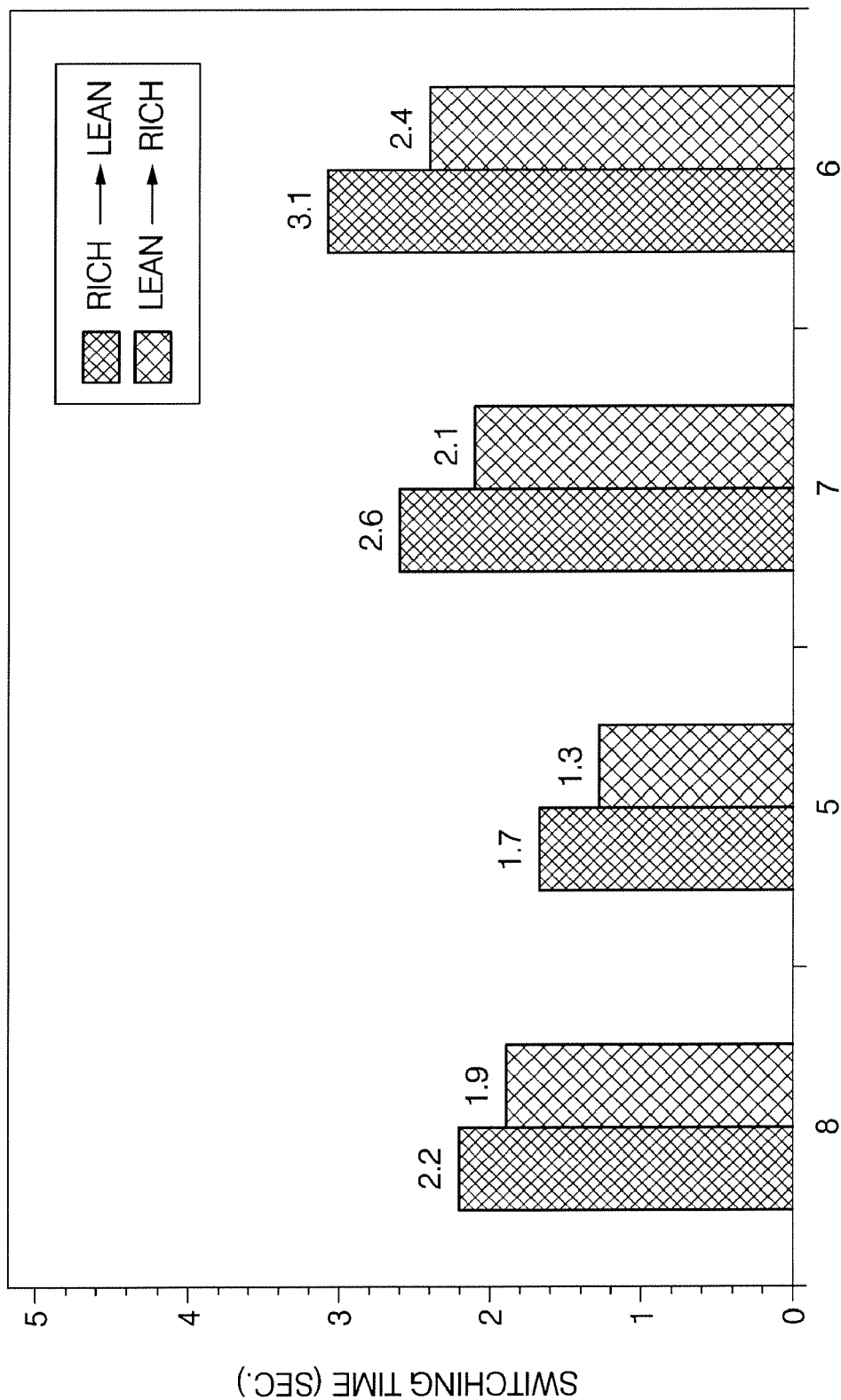
FIG. 17 is a bar graph comparing switching time for oxygen storage capacity (OSC) at 50 hours of fuel-cut aging, with a maximum bed temperature of 1,000° C., for 2-layer/2-pass calcined catalyst compositions using convectional heating versus those dried electromagnetically.
Figure 18:
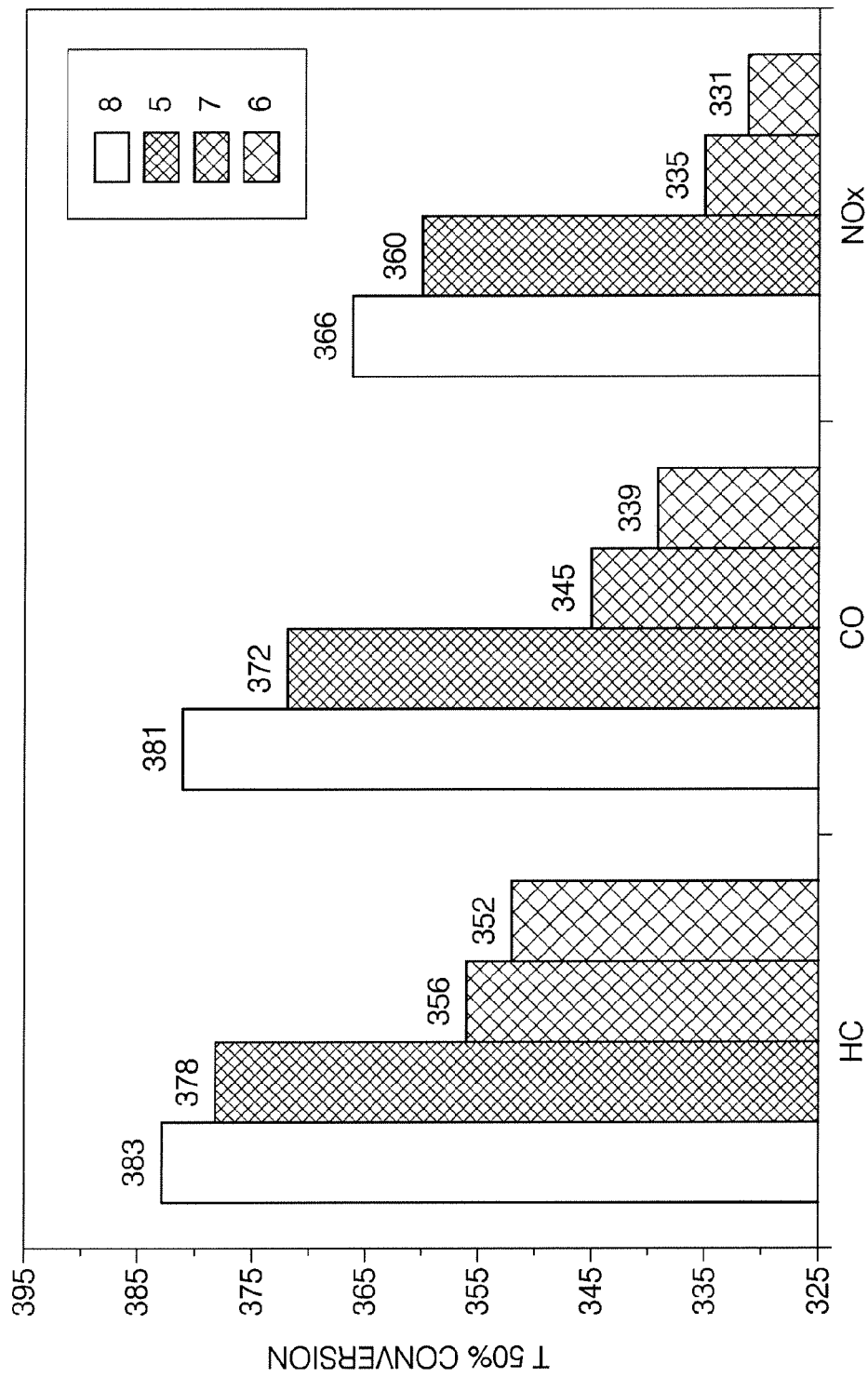
FIG. 18 is a bar graph comparing light-off performance temperatures at 50% conversion (after 100 hours of the hot lean aging with a maximum bed temperature of 1,025° C.) for HC, CO, and NOx emissions for 2-layer/2-pass calcined catalyst compositions using convectional heating versus those dried electromagnetically.
Figure 19:
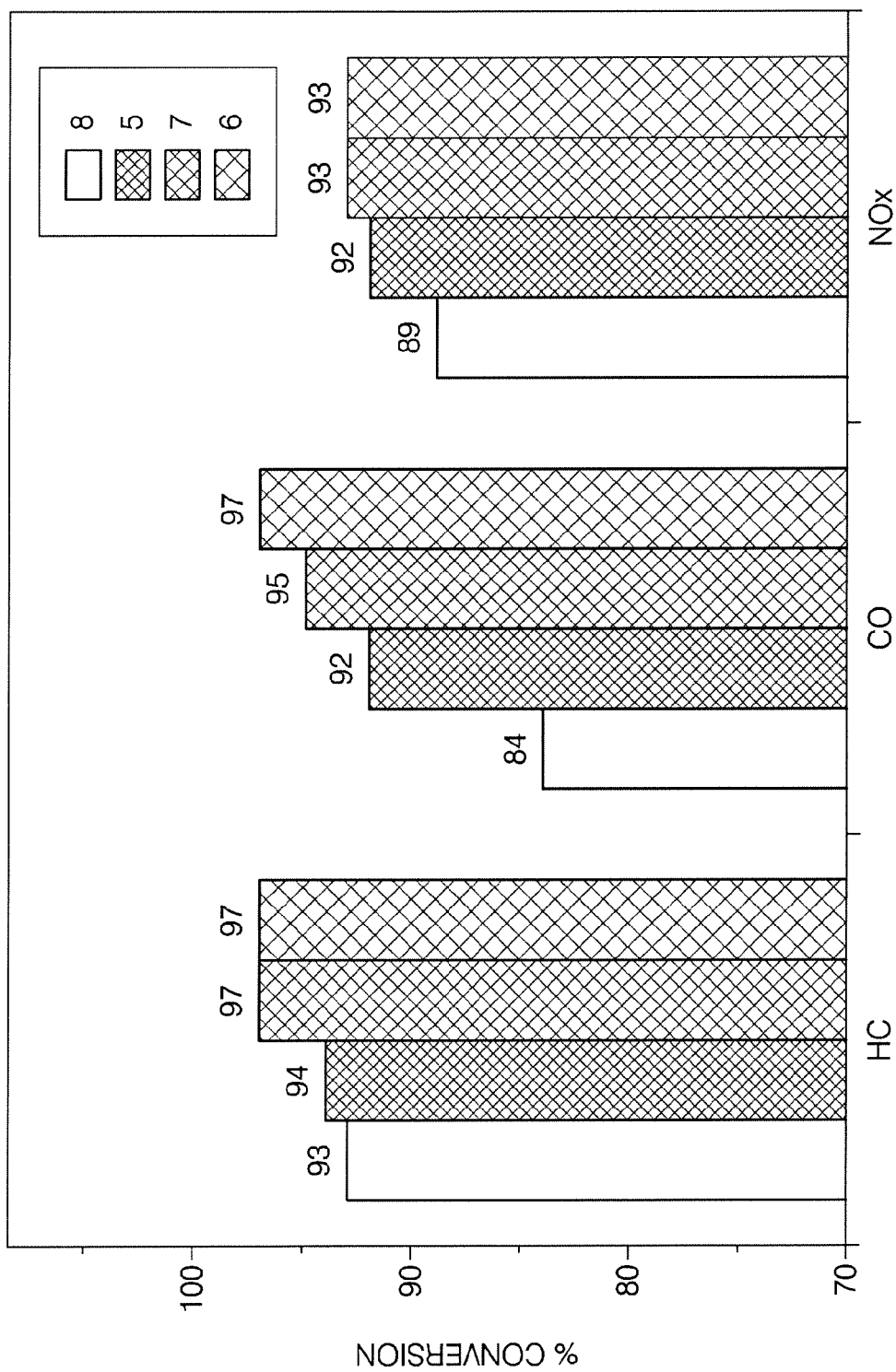
FIG. 19 is a bar graph comparing the percent conversion of HC, CO, and NOx emissions (after 100 hours of the hot lean aging with a maximum bed temperature of 1,025° C.) for 2-layer/2-pass calcined catalyst compositions using convectional heating versus those dried electromagnetically.
Figure 20:
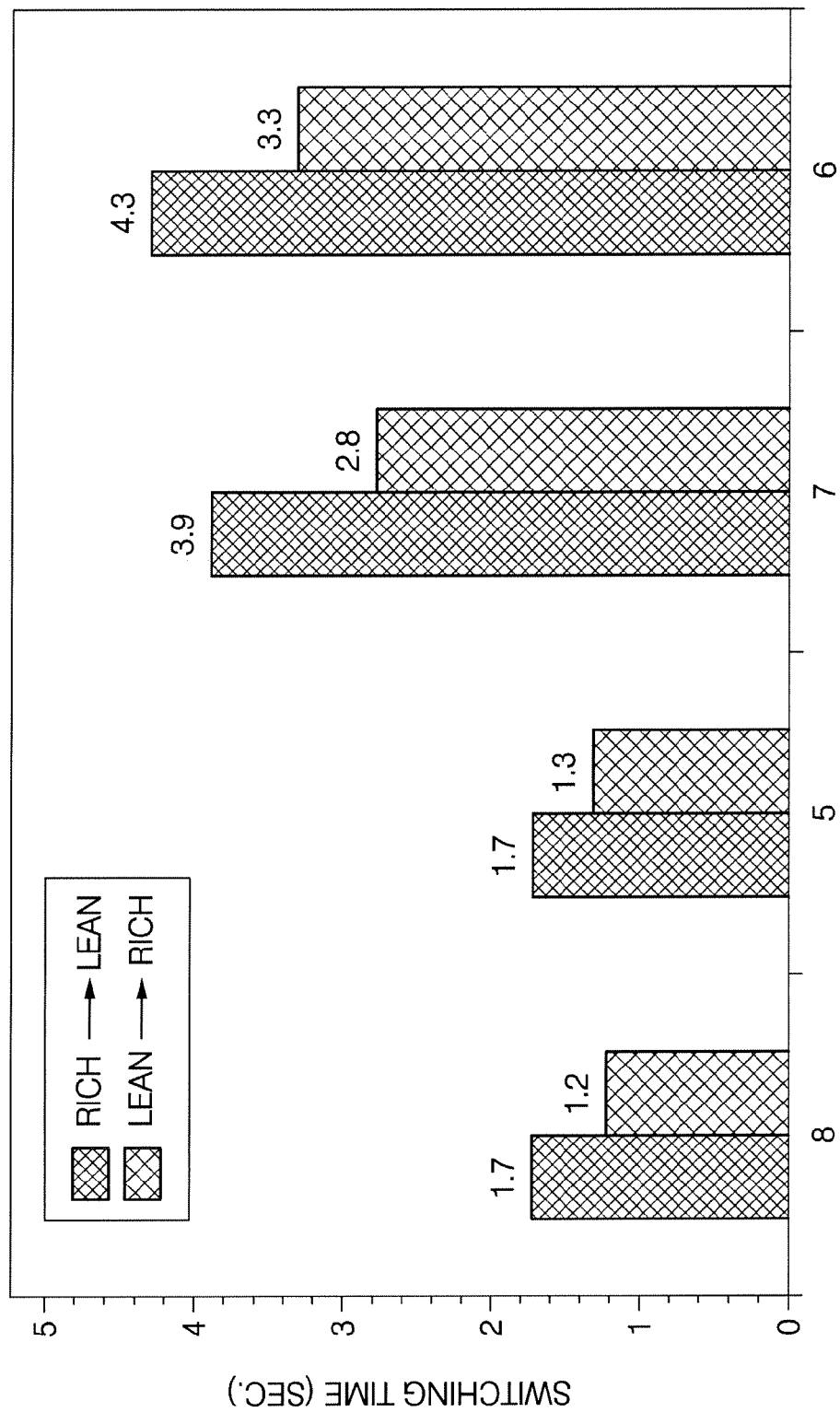
FIG. 20 is a bar graph comparing switching time for rich to lean fuel mixtures and vice versa at 100 hours of the hot lean aging, with a maximum bed temperature of 1,025° C., for 2-layer/2-pass calcined catalyst compositions using convectional heating versus those dried electromagnetically.

In FIGS. 15, 16 and 17 are summarized the results after 100 hours of the fuel cut aging (maximum bed temperature=1,000° C.). No measurable differences are observed for light-off (FIG. 15), traverse activity (FIG. 16) or OSC activity (FIG. 17) when comparing catalysts where the Pt layer was processed using DE drying or calcined using standard drying/calcination. In FIGS. 18, 19 and 20 are compared the performance results after 100 hours of hot lean aging with a maximum bed temperature of 1,025° C. Once again no negative effects of electromagnetic drying are observed.

Example 7

In this example, the catalytically active metals were again applied in two layers to the catalyst composition. The first coating comprising platinum nitrate was applied to the substrate in a first pass followed by either electromagnetic drying or a combination of electromagnetic drying and calcination using convectional heating, while a second coating comprising rhodium nitrate was applied in a second pass following which the multilayered catalyst composition was subjected to both dielectric drying as well as calcination using convectional heating. The substrate used was a 400 cell density ceramic, 4 inches round diameter×6 inches long (volume of 75 cubic inches (in³)). The wt % of Pt on the support was 0.42 wt % and Rh was 0.1 wt %, based upon the total weight of the catalyst on the support. The density of the multilayered platinum/rhodium catalyst complex was 28.6 g/ft³, while the ratio of active platinum to rhodium was 4.1:0.1. This method of applying the catalytic coatings is termed the advanced 2-pass 2-layer technology.

Figure 21:
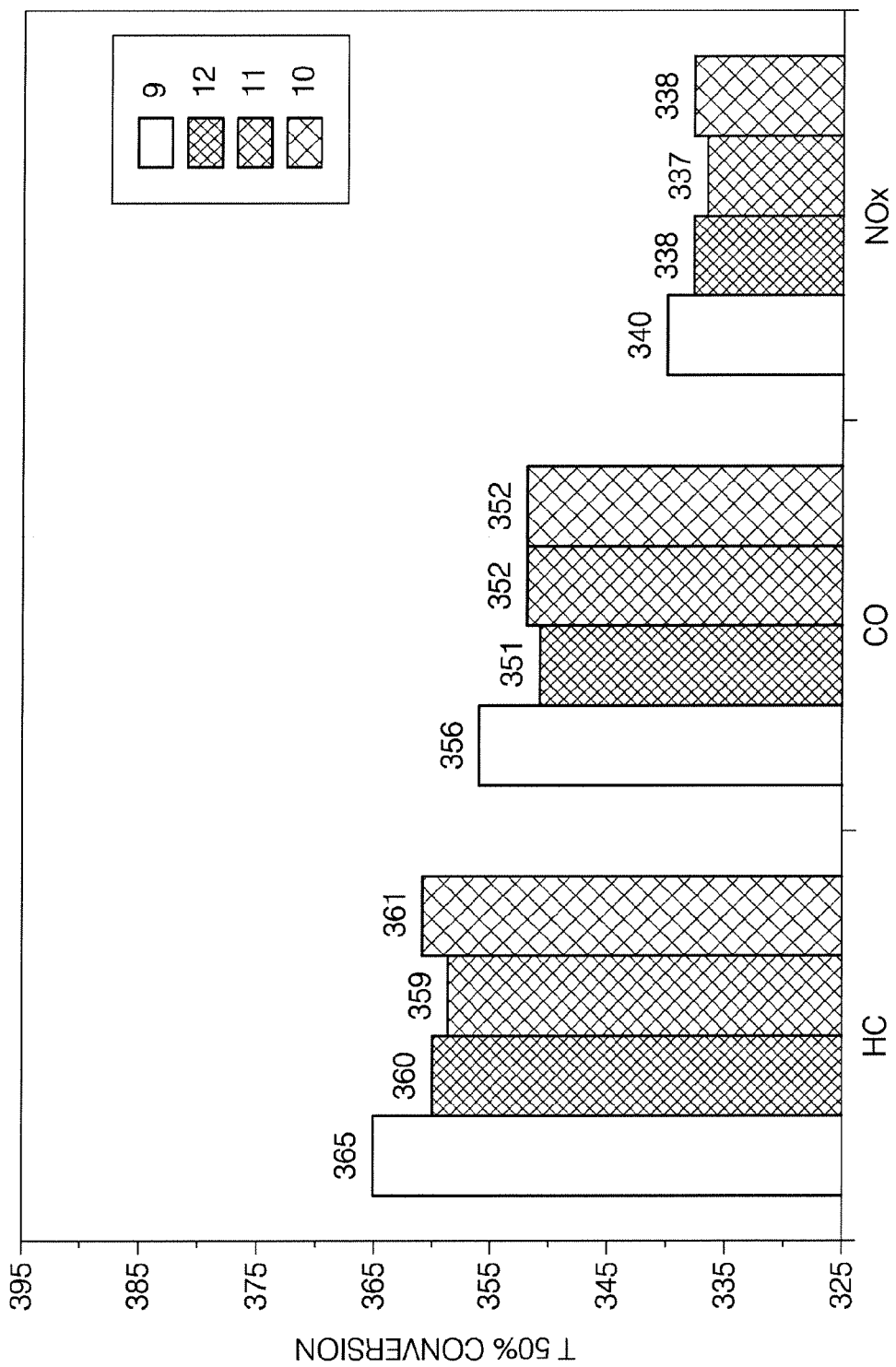
FIG. 21 is a bar graph comparing light-off performance temperatures at 50% conversion (after 100 hours of non-fuel aging with a maximum bed temperature of 1,050° C.) for HC, CO, and NOx emissions for the 2-layer/2-pass calcined catalyst compositions using convectional heating versus those dried electromagnetically.
Figure 22:
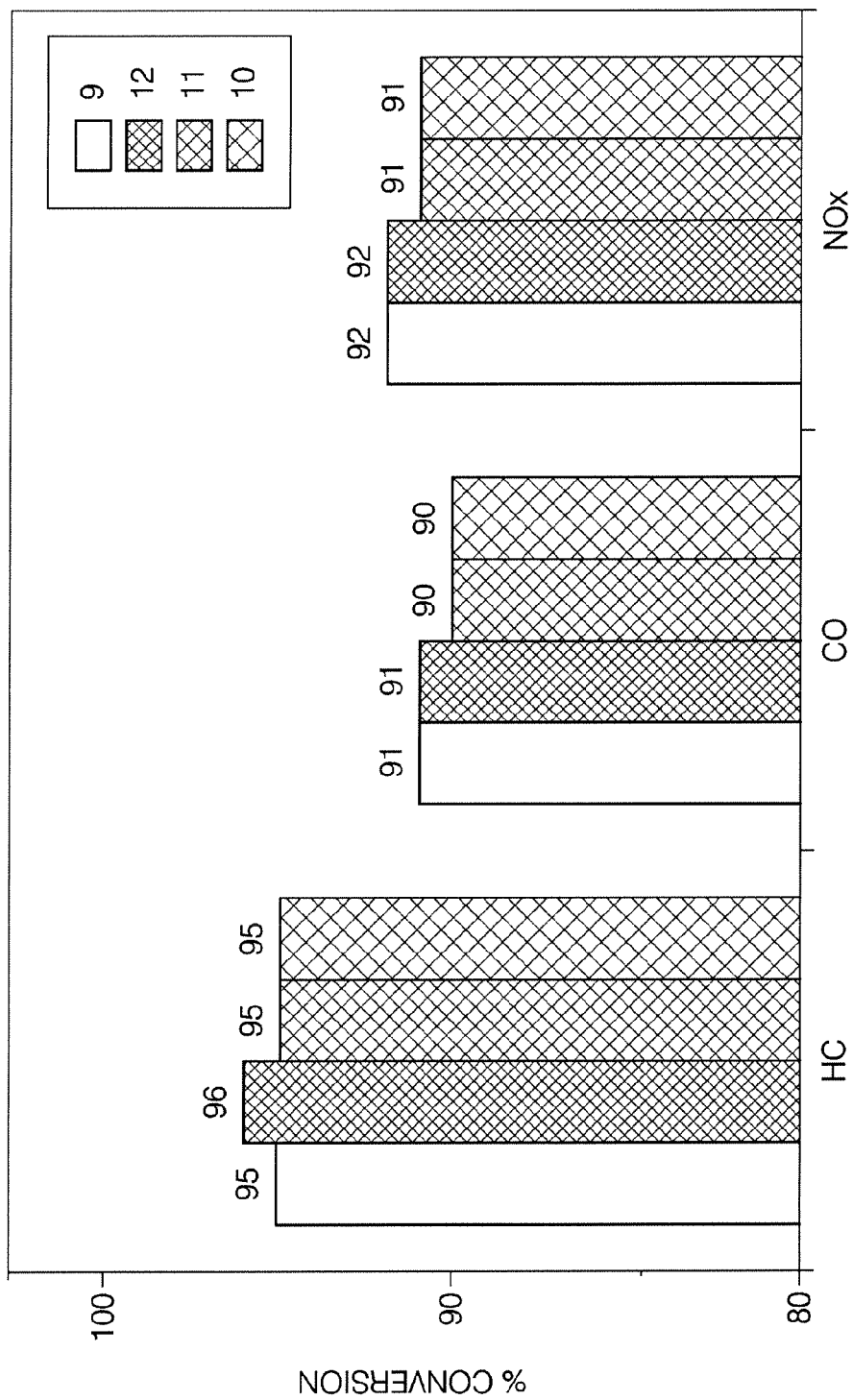
FIG. 22 is a bar graph comparing the percent conversion of HC, CO, and NOx (after 100 hours of non-fuel cut aging with a maximum bed temperature of 1,050° C.) for the 2-layer/2-pass calcined catalyst compositions using convectional heating versus those dried electromagnetically.
Figure 23:
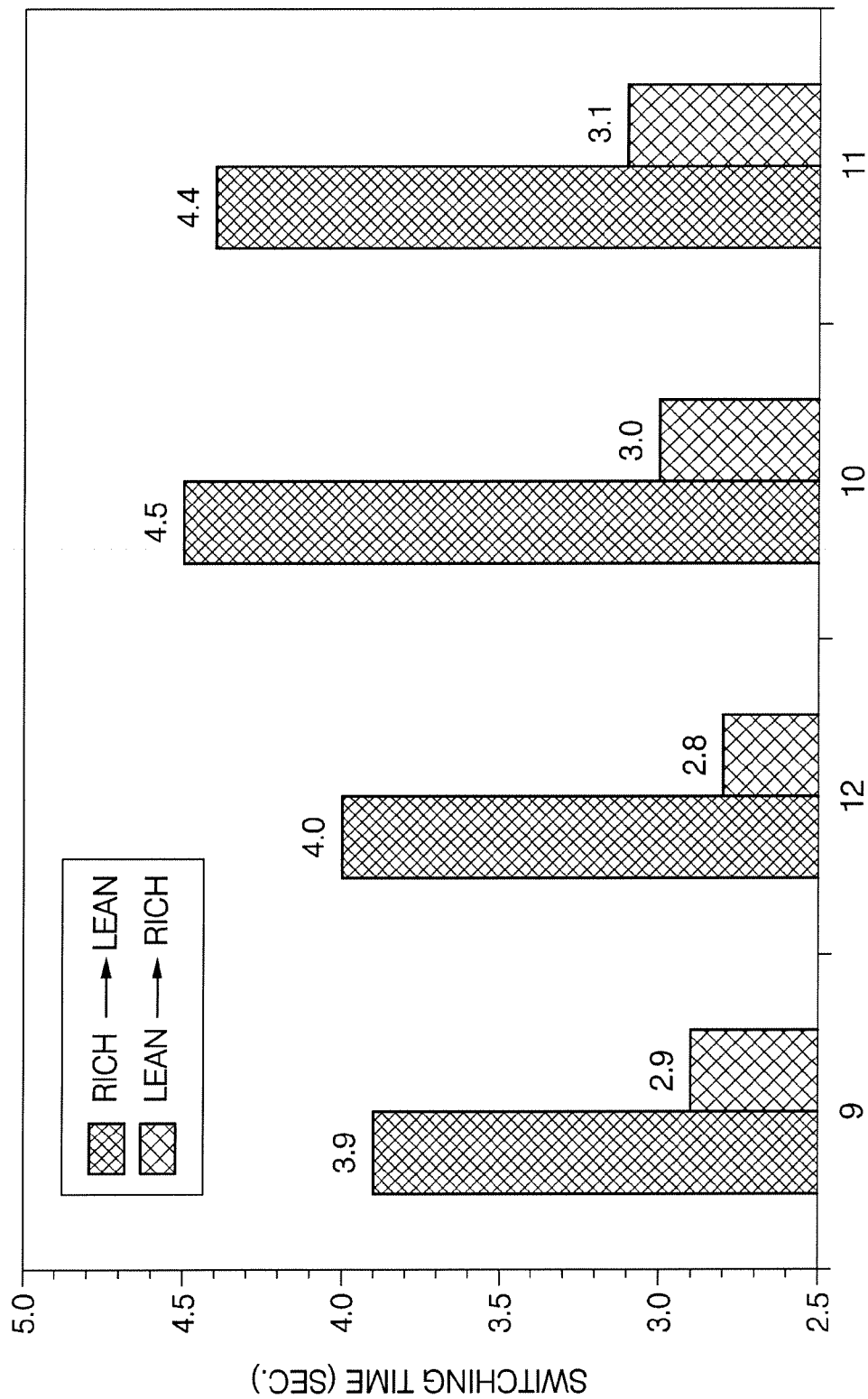
FIG. 23 is a bar graph showing switching time for rich to lean fuel mixtures and vice versa (after 100 hours of non-fuel cut aging with a maximum bed temperature of 1,050° C.) for the 2-layer/2-pass calcined catalyst compositions using convectional heating versus those dried electromagnetically.

In Table 3 are compared the drying/calcination procedures for this set of Pt/Rh catalysts where in this case both the Pt and Rh layers were electromagnetically dried before a final standard drying/calcination step. The performance results for light-off, A/F traverse activity and OSC are summarized in FIGS. 21, 22 and 23 respectively after 100 hours of the severe aging (a maximum bed temperature of 1,050° C.). This aging was done on a Chevrolet 7.4 L V-8 engine with a closed loop wide range sensor control and multi-point fuel injection. The aging cycle included a 20 second stoichiometric mode with a catalyst bed temperature of 950° C., a six second rich mode (A/F of 13.15); a 10 second lean (A/F of 14.8) exotherm mode with a bed temperature of 1,050° C. and finally a 4 second lean (A/F of 16.15) mode with secondary air added. Again no negative effects of electromagnetic drying on performance are observed. The above examples clearly show that the time consuming and expensive steps of standard drying/calcination can be replaced by electromagnetic drying with the accompanying advantages in manufacturing cost, reduced processing time, improved product quality and potential performance advantages.

TABLE 3

| | Drying Techniques | |
|---|---|---|
| Sample No. | Platinum Layer | Rhodium Layer |
| 9 | Calcination by convection | Calcination by convection |
| 10 | Electromagnetic heating | Electromagnetic heating + Calcination by convection |
| 11 | Electromagnetic heating + Calcination by convection | Electromagnetic heating + Calcination by convection |
| 12 | Calcination by convection | Calcination by convection |

In FIG. 24 is shown a plot of the dielectric loss factor as a function of moisture content. From Equation I, it is seen that the energy dissipation per unit volume is directly proportional to the dielectric loss factor where other factors remain constant. FIG. 24 shows that as the moisture content reduces so does the rate of energy dissipation within the sample and the slower the drying rate at lower moisture levels. At low water contents, the dielectric loss factor and thus rate of drying is greatly reduced and changes very little over time due to the presence of chemically bound water. Chemically bound water can be viewed as analogous to ice which has a dielectric loss factor up to 2,000 times less than liquid or physi-sorbed water. Thus, the weight of the sample being dried will tend towards a constant and stable value. As noted earlier this has important advantages in defining a rapid and stable weight for wash-coated substrates and greatly facilitates PGM accounting through weighing of the dried part. A drying process that allows rapid and reproducible/stable dried weights under ambient conditions to be achieved thus allowing accurate PGM accounting by weighing for PGM containing monolithic or other catalysts.

Example 8

As noted herein, reduction of the catalyst gradient can be attained with electromagnetic drying. The gradient is established as set form in Equation II:

$$\frac{Conc_{max} - Conc_{min}}{Conc_{Avg}} \qquad \text{II}$$

where: $Conc_{max}$=the maximum concentration by weight
$Conce_{min}$=the minimum concentration by weight
$Conc_{Avg}$=the average concentration by weight The number of portions of the catalyst substrate employed to determine the average was dependent upon the length of the substrate in the flow direction. For catalyst substrates that had a length of less than or equal to 3 inches, the substrate was cut, in a direction perpendicular to the direction of flow, into two equal size wafers. The loading was then determined on each portion of the substrate. For larger catalyst substrates, the substrate was cut, in a direction perpendicular to the direction of flow, into three equal size portions. It is understood that any number of substrate portions can be employed, with greater accuracy attained as more portions are employed. For this Example 8, one data point was used. The part is cut in half and each half crushed, homogenized and then analyzed by XRF (x-ray fluorescence) for lanthanum and palladium. For lanthanum we get a large linear gradient with one half being low in lanthanum and the other high. The average was the sum of the two halves divided by two.

A catalyst was formed by forming a slurry comprising sufficient water, nitric acid, lanthanum oxide, barium sulfate, alumina, and palladium nitrate to produce, after drying, parts having about 0.18 grams per cubic inch (g/in$^3$) BaSO$_4$, and 1.64 g/in$^3$ alumina that contained about 4 wt % lanthana, 150 g/ft$^3$ Pd, and 44.19 g/ft$^3$ added La$_2$O$_3$. The slurry was washcoated onto 3.15 inch by 4.92 inch by 2.0 inch oval, 600 cpsi (cells per square inch) ceramic substrates. Sample 13 was dried in an oven at temperatures of up to about 357° C. and then calcined at a temperature of about 410° C. to 525° C. Samples 14-17 were dried using radio frequency radiation at 16 megahertz (MHz) for 20 minutes, using a conveyor RF dryer with forced air for exhaust moisture removal. When dry, the parts contained about 0.18 grams per cubic inch (g/in$^3$) BaSO$_4$, 1.64 g/in$^3$ alumina that contained about 4 wt % lanthana, 150 g/ft$^3$ Pd, and 44.19 g/ft$^3$ added La$_2$O$_3$. Table 4 compares the lanthanum and palladium concentration gradients (by weight) over the entire substrate surface.

TABLE 4

| Sample | Drying Technique | Lanthanum (%) | Palladium (%) |
|---|---|---|---|
| 13 | convection/conduction | 42 | 11 |
| 14 | radio frequency | 6 | 11 |
| 15 | radio frequency | 6 | 9 |
| 16 | radio frequency | 9 | 11 |
| 17 | radio frequency | 11 | 13 |

As is clear from Table 4, during convection/conduction drying, substantial lanthanum gradients result; in the order of 40%. In contrast, using the RF drying, the gradient was less than or equal to about 30%, more particularly, less than or equal to about 20%, and even more particularly, less than or equal to about 15%, with less than or equal to about 10% readily attainable.

Further, the above detailed methods of electromagnetically (e.g., dielectrically) drying the wet catalyst composition at temperatures above the dew point followed by calcination in the emission stream of an internal combustion engine has a number of advantages. It avoids the extensive time (3 to 7 hours) and high temperatures (about 500° C.) involved in calcining using convection or conduction (e.g., the catalyst does not need to be heated to temperatures exceeding about 400° C. prior to being disposed in the stream to be treated, or more specifically exceeding 300° C. for many catalyst systems, during the production process). Electromagnetic drying is more uniform across the bulk of the wet catalyst composition and generally overcomes problems such as chemical concentration gradients and physical property gradients produced in catalyst compositions obtained by calcining using convection or conduction.

Furthermore, the NO$_x$ emissions in the stream to be treated during this calcining are not high and will not pose a problem for the end user. This advantage is significant in that it essentially permits the elimination of the calcining using convection or conduction step from catalyst production. Electromagnetic drying is in general more predictable, less expensive and has greater reproducibility in terms of the amount of catalytically active metal on the final product than calcining using convection or conduction of wet catalyst compositions.

The manufacturing process used to produce catalyst compositions from volatile and non-volatile precursors, such as automotive catalysts for exhaust treatment and the like, employed a calcination step designed to remove volatile components and decompose precursors of the active form of the catalyst, as well as to ensure strong bonding between the catalyst composition and the substrate. Many catalyst precursors contain nitrogen in various forms, which leads to emissions of nitrogen oxides during the calcination step. These emissions are normally abated by scrubbing, which adds complexity to the manufacturing process, requires consumable scrubbing reagent, and produces a waste stream.

With the electromagnetic drying process, the nitrogen-containing components of the catalyst precursors can be decomposed in the exhaust stream to be treated and the intrinsic NOx abating function of the catalyst is used to render NOx harmless by reducing it to nitrogen, thus eliminating the need for NOx abatement in the manufacturing process.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for manufacturing a catalyst for use in an exhaust emission control device, comprising:
    forming a catalyst composition from a catalyst precursor and a volatile compound;
    disposing the catalyst composition on a substrate to form a supported composition;
    treating the supported composition with electromagnetic radiation; and
    removing at least a portion of the volatile compound to form an uncalcined catalyst layer,
    wherein the substrate is selected from the group consisting of foils, preforms, mats, fibrous materials and monoliths, and wherein the catalyst is not calcined prior to contact with a stream to be treated.

2. The method of claim 1, wherein the electromagnetic radiation comprises a frequency selected from the group consisting of radio frequency, microwave frequency, and a combination comprising at least one of the foregoing frequencies.

3. The method of claim 2, wherein the radio frequency radiation and microwave frequency radiation are sequentially utilized.

4. The method of claim 1, wherein greater than or equal to about 90 wt % of the volatile compound is removed.

5. The method of claim 1, wherein greater than or equal to about 98 wt % of the volatile compound is removed.

6. The method of claim 1, wherein the removal of at least a portion of the volatile compound further comprises agitating.

7. The method of claim 1, wherein the electromagnetic radiation treats the supported composition without calcining.

8. The method of claim 1, wherein the uncalcined catalyst layer comprises a concentration gradient of less than or equal to about 20%.

9. The method of claim 8, wherein the concentration gradient is less than or equal to about 15%.

10. The method of claim 1, further comprising calcining the uncalcined catalyst layer.

11. The method of claim 1, further comprising providing a calcined catalyst layer.

12. A method for manufacturing a catalyst for use in an exhaust emission control device, comprising:
    forming a catalyst composition from a catalyst precursor and a volatile compound;
    disposing the catalyst composition on a substrate to form a supported composition;

treating the supported composition with electromagnetic radiation;

removing at least a portion of the volatile compound to form an uncalcined catalyst layer, wherein the substrate is selected from the group consisting of foils, preforms, mats, fibrous materials and monoliths; and installing the catalyst in the exhaust emission control device and then calcining the catalyst.

13. The method of claim 12, wherein the electromagnetic radiation comprises a frequency selected from the group consisting of radio frequency, microwave frequency, and a combination comprising at least one of the foregoing frequencies.

14. The method of claim 13, wherein the radio frequency radiation and microwave frequency radiation are sequentially utilized.

15. The method of claim 13, wherein the catalyst is not calcined prior to contact with a stream to be treated.

16. The method of claim 12, wherein greater than or equal to about 90 wt % of the volatile compound is removed.

17. The method of claim 12, wherein greater than or equal to about 98 wt % of the volatile compound is removed.

18. The method of claim 12, wherein the removal of at least a portion of the volatile compound further comprises agitating.

19. The method of claim 12, wherein the electromagnetic radiation treats the supported composition without calcining 20. The method of claim 19, wherein the catalyst is not calcined prior to contact with a stream to be treated.

21. The method of claim 12, wherein the uncalcined catalyst layer comprises a concentration gradient of less than or equal to about 20%.

22. The method of claim 21, wherein the concentration gradient is less than or equal to about 15%.

23. The method of claim 12, further comprising calcining the uncalcined catalyst layer.

24. The method of claim 12, further comprising providing a calcined catalyst layer.

* * * * *